(12) United States Patent
Levi et al.

(10) Patent No.: US 11,606,043 B2
(45) Date of Patent: Mar. 14, 2023

(54) BALANCED CAPACITOR POWER CONVERTER

(71) Applicant: Solaredge Technologies Ltd., Herzeliya (IL)

(72) Inventors: Raanan Levi, Beit Aryeh (IL); Dor Shoshani, Tel Aviv (IL); Amir Kipper, Hod Hasharon (IL)

(73) Assignee: Solaredge Technologies Ltd., Herzeliya (IL)

( * ) Notice: Subject to any disclaimer, the term of this patent is extended or adjusted under 35 U.S.C. 154(b) by 52 days.

(21) Appl. No.: 16/729,543

(22) Filed: Dec. 30, 2019

(65) Prior Publication Data

US 2020/0212806 A1 Jul. 2, 2020

Related U.S. Application Data

(60) Provisional application No. 62/786,723, filed on Dec. 31, 2018.

(51) Int. Cl.
*H02M 7/483* (2007.01)
*H02M 3/158* (2006.01)
(Continued)

(52) U.S. Cl.
CPC ......... *H02M 7/483* (2013.01); *H02M 3/1584* (2013.01); *H02M 3/33507* (2013.01);
(Continued)

(58) Field of Classification Search
CPC ........... H02M 3/1584; H02M 3/33507; H02M 7/4833; H02M 7/483; H02M 7/487;
(Continued)

(56) References Cited

U.S. PATENT DOCUMENTS 5,581,454 A * 12/1996 Collins .................. H02M 3/07
363/59
5,946,208 A * 8/1999 Yamamoto ............ H02M 7/538
363/41
(Continued)

FOREIGN PATENT DOCUMENTS

EP         1107438 A2    6/2001
WO       2018061077 A1    4/2018

OTHER PUBLICATIONS

May 19, 2020—Extended European Search Report—EP 19219881.0.

(Continued)

*Primary Examiner* — Yusef A Ahmed
(74) *Attorney, Agent, or Firm* — Banner & Witcoff, Ltd.

(57) ABSTRACT

A power device may have at least two capacitors in series with each other and in parallel with a DC power source. The power device may have at least a first converter that has at least a controller configured to balance a voltage of the at least two capacitors. The power device may have at least a second converter connected to the at least two capacitors. The second converter may have at least three input conductors, each connected to a terminal of the at least two capacitors. The second converter may have at least two output conductors. The second converter may have at least a switching circuit between the at least three input conductors and at least two output conductors. The second converter may have at least a controller configured to operate the switching circuit. The second converter may passively preserve the voltage balance between the at least two capacitors.

20 Claims, 13 Drawing Sheets

(51) Int. Cl.
*H02M 3/335* (2006.01)
*H02M 7/487* (2007.01)
*H02M 1/00* (2006.01)
*H02M 3/155* (2006.01)
*H02M 3/156* (2006.01)

(52) U.S. Cl.
CPC ......... *H02M 7/487* (2013.01); *H02M 7/4833* (2021.05); *H02M 1/0074* (2021.05); *H02M 1/0095* (2021.05); *H02M 3/155* (2013.01); *H02M 3/156* (2013.01); *H02M 3/335* (2013.01)

(58) Field of Classification Search
CPC .. H02M 1/0074; H02M 1/0095; H02M 3/155; H02M 3/156; H02M 3/335; H02M 1/0006
See application file for complete search history.

(56) References Cited

U.S. PATENT DOCUMENTS

| | | | | |
|---|---|---|---|---|
| 6,058,031 | A * | 5/2000 | Lyons | H02M 7/487 363/67 |
| 9,413,221 | B1 * | 8/2016 | Kim | H02M 7/217 |
| 9,853,567 | B2 * | 12/2017 | Flett | H02J 3/46 |
| 10,516,365 | B1 * | 12/2019 | Serban | H02M 3/07 |
| 10,523,130 | B2 * | 12/2019 | Bax | H02M 1/12 |
| 10,536,094 | B2 * | 1/2020 | Zmood | H02M 1/08 |
| 10,541,619 | B2 * | 1/2020 | Ji | H02M 3/33571 |
| 10,541,623 | B1 * | 1/2020 | Michal | H02M 7/483 |
| 2002/0110010 | A1 * | 8/2002 | Davila | H02M 3/33571 363/98 |
| 2006/0197491 | A1 * | 9/2006 | Nojima | H02M 7/487 318/801 |
| 2006/0245216 | A1 * | 11/2006 | Wu | H02M 7/4833 363/13 |
| 2009/0046491 | A1 * | 2/2009 | Zacharias | H02M 7/5387 363/134 |
| 2009/0046492 | A1 * | 2/2009 | Zacharias | H02M 7/5387 363/134 |
| 2009/0160254 | A1 * | 6/2009 | Wu | H02M 1/4208 307/64 |
| 2011/0134672 | A1 * | 6/2011 | Sato | H02M 1/10 363/126 |
| 2012/0020137 | A1 * | 1/2012 | Abe | H02M 7/538 363/131 |
| 2012/0161858 | A1 | 6/2012 | Permuy et al. | |
| 2013/0114320 | A1 | 5/2013 | Permuy | |
| 2014/0016382 | A1 * | 1/2014 | Teo | H02M 7/5395 363/123 |
| 2014/0050000 | A1 * | 2/2014 | Teo | H02M 7/487 363/131 |
| 2014/0376287 | A1 * | 12/2014 | Narimani | H02M 7/483 363/60 |
| 2015/0002066 | A1 * | 1/2015 | Oda | H02M 5/4585 318/500 |
| 2015/0131349 | A1 | 5/2015 | El-Barbari et al. | |
| 2015/0372615 | A1 * | 12/2015 | Ayyanar | H02M 7/48 363/131 |
| 2016/0006365 | A1 * | 1/2016 | Perreault | H02M 1/4208 363/89 |
| 2016/0043659 | A1 * | 2/2016 | Xu | H02M 1/088 363/131 |
| 2016/0190940 | A1 * | 6/2016 | Yan | H02M 3/285 363/17 |
| 2016/0336872 | A1 * | 11/2016 | Cheng | H02M 7/487 |
| 2016/0352251 | A1 * | 12/2016 | Li | H02M 7/487 |
| 2017/0085183 | A1 * | 3/2017 | Notsch | H02M 1/44 |
| 2018/0019685 | A1 * | 1/2018 | Yamashita | H02M 1/32 |
| 2018/0062537 | A1 * | 3/2018 | Wang | H02J 3/383 |
| 2018/0175732 | A1 * | 6/2018 | Dai | H02M 3/33507 |
| 2018/0241320 | A1 * | 8/2018 | Wang | H02M 7/5387 |
| 2018/0248493 | A1 * | 8/2018 | Mihalache | H02M 7/4837 |
| 2018/0278177 | A1 * | 9/2018 | Glovinsky | H02M 3/1584 |
| 2018/0309379 | A1 * | 10/2018 | Basic | H02M 5/458 |
| 2018/0309383 | A1 * | 10/2018 | Wang | H02M 1/32 |
| 2018/0309384 | A1 * | 10/2018 | Wang | H02M 7/483 |
| 2019/0058416 | A1 * | 2/2019 | Wang | H02M 7/48 |
| 2020/0028440 | A1 * | 1/2020 | Kadam | H02J 3/381 |
| 2020/0220466 | A1 * | 7/2020 | Backman | H02M 3/33584 |
| 2020/0389099 | A1 * | 12/2020 | Sagasta | H02M 7/4837 |
| 2021/0013816 | A1 * | 1/2021 | Davidson | H02M 7/4837 |
| 2021/0067045 | A1 * | 3/2021 | Zhang | H02M 1/083 |

OTHER PUBLICATIONS

Newton C et al, "Novel technique for maintaining balanced internal DC link voltages in diode clamped five-level inverters", May 11, 1999.

Monges B et al, "Capacitor Voltage Balance for the Neutral-Point-Clamped Converter using the Virtual Space Vector Concept With Optimized Spectral Performance", Jul. 1, 2007.

Yan Zhu et al, "Three-Level Switching Cell for Low Voltage/High-Current DC-DC Converters", Sep. 1, 2007.

Torresan H D et al, "Auxiliary power supplies for high voltage converter systems", Jun. 20, 2004.

Sep. 7, 2022—EP Office Action—EP App. No. 19219881.0.

\* cited by examiner

US 11,606,043 B2

BALANCED CAPACITOR POWER CONVERTER

CROSS-REFERENCE TO RELATED APPLICATIONS

The present application claims priority to U.S. provisional patent application Ser. No. 62/786,723, filed Dec. 31, 2018, hereby incorporated by reference as to its entirety.

BACKGROUND

The present disclosure relates to the field of electronics.

Power converters typically have an auxiliary (AUX) power supply for providing power to the electronics that control the converters, such as power to a controller, switches, communication circuits, and/or the like. The AUX power supply or converter, such as a buck or flyback direct current to direct current (DC/DC) power converter, may be able to accept a high input voltage, such as between 250 and 1000 volts DC (VDC). For example, a flyback topology may be used for generating auxiliary power to a high-voltage converter, such as used in solar inverter circuits. For example, an auxiliary power supply feeds an inverter in a solar power generation system, and the inverter converts the solar power from a string of photovoltaic panels (such as a 600 VDC input) into alternating current (AC) power supplied to a home or fed in to an electrical grid (such as 240 VAC).

SUMMARY

The following is a short summary of some of the inventive concepts described herein, is presented for illustrative purposes only and not as an extensive overview, and is not intended to identify key or critical elements or to limit or constrain the features described in the detailed description.

Aspects disclosed herein are directed to devices and methods for a power diverting topology that draws power from balanced capacitors. The power may be drawn without affecting the energy balance between the capacitors. The topology may include, for example, direct-current (DC) link capacitors used in a neutral point clamped (NPC) inverter topology, three-stage NPC inverter topologies, multi-stage NPC inverter topologies, and/or the like. Some of the devices and/or methods may include using a topology of two or more diodes and/or two or more switches to intrinsically draw power from a balanced, multiple-capacitor converter design without disrupting the charge balance across the capacitors, such as when using an open-loop control. A switching circuit for providing auxiliary (AUX) power may be connected to the balanced capacitors, potentially allowing the capacitor balance to not be disrupted by the additional power drawn from the capacitors. An additional switch may be used to draw power from both series-connected capacitors under certain conditions, such as when the voltage across the capacitors is low.

In accordance with further aspects as disclosed herein, a power device is disclosed that may comprise a plurality of capacitors that are connected in series with each other and in parallel with a direct current (DC) power source; a first converter comprising a controller configured to balance voltages across each of the plurality of capacitors; and a second converter connected to terminals of the plurality of capacitors and configured to generate an output voltage based on the voltages across the capacitors. The first converter may be configured to actively balance (e.g., strongly preserve the balances of) the voltages across the at least two capacitors, and the second converter may be configured to passively (e.g., weakly) preserve the voltage balance between the plurality of capacitors.

The second converter may comprise (a) at least three input conductors, each connected to a terminal of one of the plurality of capacitors, (b) at least two output conductors, each connected to the output voltage, (c) a switching circuit connected between the at least three input conductors and at least two output conductors, and (d) a controller configured to operate the switching circuit. The controller may be configured to operate the switching circuit with an open-loop control operating at a particular frequency, such as at a frequency of less than 10,000 hertz. The switching circuit may comprise at least two switches configured to alternate between electrically connecting in turn each of the plurality of capacitors to the two output conductors. The switching circuit may comprise at least two diodes or switches to direct a current from at least one of the plurality of capacitors to the at least two output conductors.

The at least three input conductors may comprise a low voltage conductor, a high voltage conductor, and a mid-voltage conductor. The at least two diodes may comprise a first diode and a second diode, each comprising an anode terminal and a cathode terminal, and wherein the at least two switches comprise a first switch and a second switch, each switch comprising a source terminal and a drain terminal, and wherein: (a) the source terminal of the first switch is connected to the low voltage conductor, (b) the anode terminal of the first diode is connected to the drain terminal of the first switch, (c) the cathode terminal of the first diode and the anode terminal of the second diode are connected to the neutral point conductor, (d) the cathode terminal of the second diode is connected to the source terminal of the second switch, and (e) the drain terminal of the second switch is the high voltage conductor. The at least two diodes may comprise, for example, four diodes in a diode bridge configuration, the diode bridge configuration comprising an anode terminal, a cathode terminal, and two alternating current terminals, wherein the at least two switches comprise a first switch and a second switch, each switch comprising a source terminal and a drain terminal, and wherein: (a) the source terminal of the first switch is connected to the low voltage conductor, (b) the anode terminal of the diode bridge configuration is connected to the high output voltage conductor, (c) the cathode terminal of the diode bridge configuration is connected to the low output voltage terminal, (d) the drain terminal of the first switch is connected to the source terminal of the second switch and a first alternating current terminal of the diode bridge configuration, (e) the second alternating current terminal of the diode bridge configuration is connected to the neutral point conductor, and (f) the drain terminal of the second switch is the high voltage conductor. Alternatively, the diode bridge configuration may comprise an anode terminal, a cathode terminal, and two alternating current terminals, wherein the at least two switches comprise a first switch, a second switch, and a third switch, each switch comprising a source terminal and a drain terminal, and wherein the source of the third switch is connected to the low voltage conductor, and wherein the drain of the third switch is connected to the cathode terminal of the diode bridge configuration.

The switching circuit may be configured to switch the terminals of the plurality of capacitors between a plurality of DC to DC power supplies, each of the DC to DC power supplies configured to provide a voltage and a current to the first converter, and the switching circuit may be configured to preserve the balance between the voltages across the plurality of capacitors. The plurality of capacitors may comprise, for example, three capacitors, the at least three input conductors may comprise, for example, four input conductors, and the switching circuit may comprise, for example, four diodes and four switches (such as in FIG. 2A).

Moreover, the plurality of capacitors may comprise a plurality of DC-link capacitors. Each of the plurality of capacitors may comprise a capacitor bank.

Further aspects as described herein are directed to a method (such as a method for operating the power device described herein) that comprises balancing, by a controller of a first converter (e.g., of the power device), voltages across each of a plurality of capacitors (e.g., of the power device) that are connected in series with each other and that are connected in parallel with a direct current (DC) power source; and generating, by a second converter (e.g., of the power device) connected to terminals of the plurality of capacitors, an output voltage based on the voltages across the plurality of capacitors. All of the above summaries of the various possible aspects of the power device likewise apply to the method.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

Figure 1:
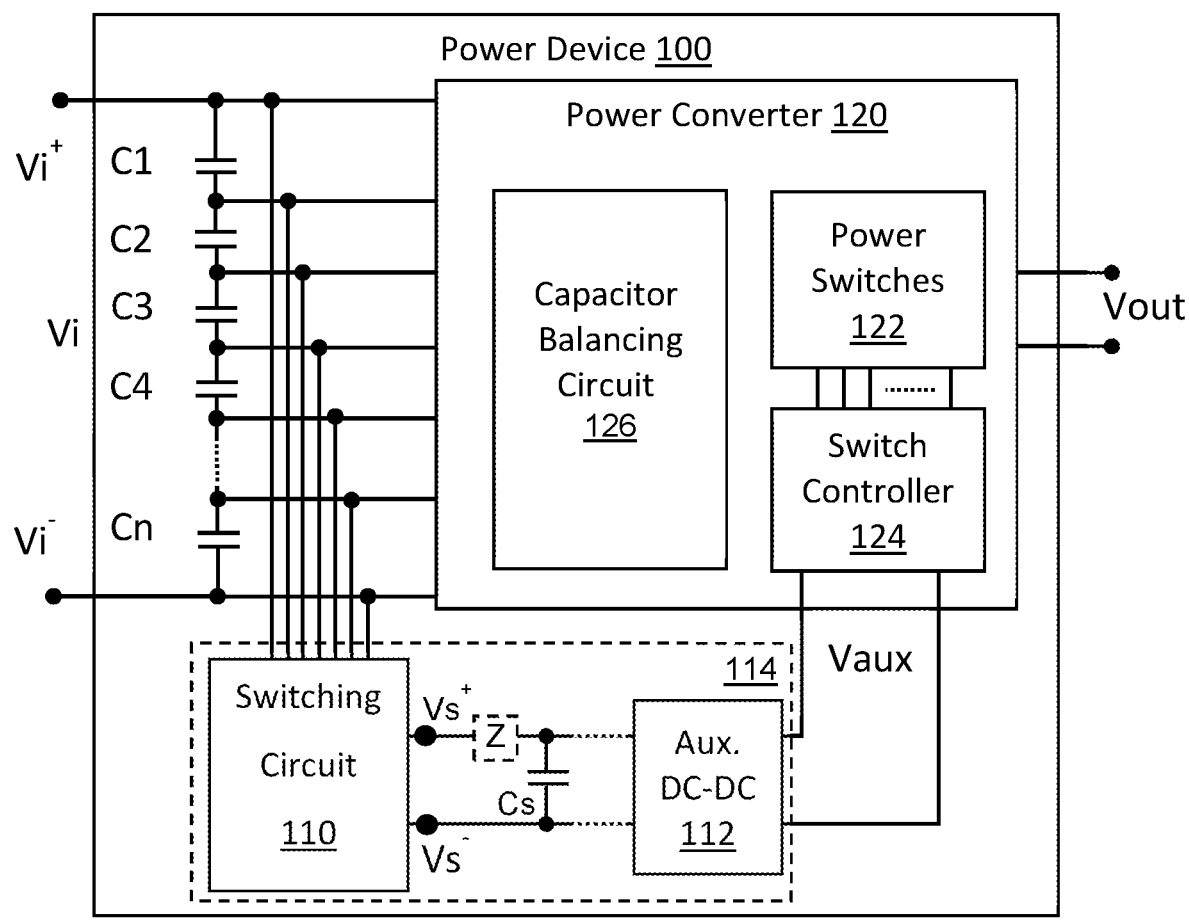
FIG. 1 shows a block diagram of an example power device with N balanced capacitors and a switching circuit, according to illustrative aspects of the disclosure.

The accompanying drawings, which form a part hereof, show examples of the disclosure. It is to be understood that the examples shown in the drawings and/or discussed herein are non-exclusive and that there are other examples of how the disclosure may be practiced.

Disclosed herein are examples of features for devices, methods, and systems that may be used for drawing power from a connected series of balanced capacitors. These examples may draw the power while intrinsically preserving the capacitor balance (such as preserving a substantially equal voltage drop across each capacitor). A power converter may use the series of balanced capacitors that may each store energy at a voltage differential that is a fraction of an input voltage value. For example, a series of n balanced capacitors (for instance, input capacitors) may be connected in series to an input voltage and each capacitor may carry a voltage of one n-th of the input voltage. The power converter may, for example, use direct current (DC)-link capacitor voltages to create an alternating current (AC) output voltage, and in turn may have a balancing circuit that may actively balance the voltages across each of the n capacitors. A switching circuit as disclosed herein, connected in parallel with the n balanced capacitors, may connect to one or more of the capacitors in turn, and may allow intrinsically drawing auxiliary power from the balanced capacitors without substantially affecting the capacitor voltage balance.

The disclosed switching circuits may not draw power from one of the input capacitors, when that capacitor has a lower voltage than the others. For example, when there is an in-balance across the input capacitors, a switching circuit may skip the lower voltage capacitors (those capacitors having lower voltages across them) and draw current from the higher voltage ones (those capacitors having higher voltages across them). This is in contrast to a capacitor balancing circuit that may actively balance the capacitors by moving charge from the high voltage capacitors to the low voltage capacitors. The switching circuit may be similar to a voltage preserving circuit that does not draw power from the low voltage capacitors. The switching circuit may be a passive circuit that, for example, does not move charge from one capacitor to the other and that does not draw power (naturally, intrinsically, by-design, and/or the like) from lower voltage capacitors when the voltage across the capacitors is different. A capacitor balancing circuit may be active or passive and adjusts the voltage to match across capacitors (such as by moving charge from one to another).

Reference is now made to FIG. 1, which shows a block diagram of an example power device 100 with n balanced capacitors C1-Cn and a switching circuit 110, according to illustrative aspects of the disclosure. Capacitors C1, C2, C3, C4, through Cn may be connected in series across a DC input voltage between terminals Vi+ and Vi. A high-voltage power converter 120 may be connected to each terminal of the capacitors C1-Cn, and an capacitor balancing circuit 126 of power converter 120 may actively balance the voltage across these capacitors C1-Cn, such as by using clamping diodes and/or the like. A switching circuit 110 may be connected in parallel with the terminals of capacitors C1-Cn. Switching circuit 110 may be, or may be part of, an auxiliary power supply of power device 100. Switching circuit 110 may be configured to provide a connection between a subset of the capacitors C1-Cn to an output voltage provided across terminals terminal Vs+ and terminal Vs−, for positive and negative terminals respectively.

The subset of the capacitors C1-Cn (such as the one or more capacitors selected as part of the subset), may be determined by switching circuit 110, and may be dynamically changed over time. An output capacitor Cs, connected across the output terminals Vs+ and Vs− of switching circuit 110, may assist in providing power to a switch controller 124, such as by supplying an input voltage to an Auxiliary DC-DC converter 112 that regulates power to an auxiliary input voltage denoted Vaux, directly from Vs+ and Vs− to Vaux (such as when Vaux has a wide input range), and/or the like. As will be explained below, switching circuit 110 may selectively connect output capacitor Cs to one or more of capacitors C1-Cn. Switch controller 124, such as a circuit including a processor and switch drivers, may operate power (such as high voltage ("HV"), for example) switches that operate power converter 120 to produce an output voltage of power converter 120, denoted Vout, across a pair of output terminals. Switching circuit 110 may be configured such that the voltage balance across the balanced capacitors C1-Cn is intrinsically preserved, allowing for an open-loop control method to be used with a low frequency switching rate.

Switching circuit 110 and Auxiliary DC-DC converter 112 may be combined into a single circuit 114 by using a feedback control for operating the switches of switching circuit 110. For example, a voltage feedback circuit may be used to provide a closed loop control to the switches of the switching circuit. For example, a buck converter may be incorporated into the switching circuit by coupling a switching circuit controller that may sense the output voltage Vaux (such as through an optocoupler, sensor, or the like), and selectively open and close the switches of the switching circuit to maintain a regulated voltage, Vaux, on the output. The inductor of Auxiliary DC-DC converter 112 may be incorporated into the switching circuit, and a controller configured to regulate the output voltage by controlling the switches. For example, a serial inductor Z may be used between switching circuit output Vs$^+$ (or Vs$^−$) prior to the positive (or negative) terminal of the output capacitor Cs, thereby incorporating a buck converter into the switching circuit. Similarly, a flyback converter may be implemented in the switching circuit and thus Auxiliary DC-DC converter 112 may not be omitted as the switching circuit may directly output Vaux to Switch controller 124.

For example, switching circuit 110 may be configured to draw power from those of the capacitors C1-Cn having a higher voltage when a voltage imbalance exists amongst the capacitors C1-Cn, thereby assisting capacitor balancing circuit 126 rather than hindering the activity of the capacitor balancing circuit 126. As used herein, the input voltage, such as the voltage difference between terminals Vi+ and Vi−, is denoted Vi. As used herein, the switching circuit output voltage, such as the voltage difference between terminals Vs+ and Vs−, is denoted Vs.

A balancing circuit for the serially-connected capacitors may be, for example, a dedicated circuit that may actively regulate the capacitor voltages so that they are of substantially equal voltage during normal operation, such as by using circuits combined with closed loop voltage clamping techniques. For example, clamping bridges based on transistors and resistors may be used. A clamping bridge control may balance the DC input voltages of each capacitor using a space vector realization, such as by using redundant switching states of a converter. A carrier-based pulse width modulation (PWM) scheme may be used, such as a zero sequence voltage signal added to the modulation signals, and/or the like. When using a Direct Torque Control technique, the differences of the capacitor voltages may be measured and a lookup table used to correct the voltage imbalance. When using predictive control based on a cost function, the balance of the capacitor voltages may be achieved simply by adding an additional term to the cost function, such as the predictive values for the capacitor voltages and a weighting factor. The voltage imbalance may be solved by using a back-to-back rectifier/inverter system and proper voltage balancing control.

Potential benefits of using a switching circuit (such as switching circuit 110) for AUX power may include obtaining a more efficient AUX power converter (such as from an AUX converter downstream), enabling use of open-loop control, efficient switching rates, robust operation in use of dead time, and/or the like. For example, by using a reduced voltage across the selected subset of the capacitors C1-Cn to generate voltage Vs, the auxiliary power supply (which may include switching circuit 110) of a high voltage power converter (such as power device 100) may comprise switches of a lower voltage rating. A lower voltage rating input switch may have a lower conduction resistance for the same current rating, and thus may be more efficient during power conversion. For example, by implementing switching circuit 110 for generating the AUX power (such as the Vaux voltage differential), the auxiliary power supply (such as switching circuit 110, a larger circuit including switching circuit 110, and/or the like) may be designed for a lower dynamic input voltage range. The lower input voltage range may facilitate a simpler and more efficient power conversion, because the variation of the duty cycle may be narrower, and PWM pulses may be wider. For example, a flyback auxiliary power supply designed to receive an input voltage between 200 VDC and 1000 VDC may be less efficient and more complex compared to a power supply designed for a narrower input voltage range of 200 V to 500 V. A wide input voltage range may mean that an AUX power supply uses a switch-mode converter topology designed for a wider dynamic duty cycle range. For example, at the high voltage end of the voltage range and at low power load, the operation of an AUX power supply may result in a duty cycle too small to achieve effective pulse widths for controlling the main power semiconductor switch at high frequency conversion, which may result in a low efficiency conversion.

In another example, power device 100 may include a pair of capacitors (thus, capacitors C1-Cn, where n=2) of a neutral point clamped (NPC) inverter comprising a first capacitor (such as C1) connected between a low-potential input terminal and a mid-voltage point, and a second capacitor (such as C2) connected between the mid-point potential and a high-potential input terminal. As used herein, the term mid-voltage means a voltage of any middle terminal of two or more series connected components, where the middle terminal is not at the high or low extremes and may or may not be exactly at a middle location in the series, and may also be referred to as a mid-potential point, a mid-point voltage, a mid-point potential, or the like. Examples of this configuration are described below with reference to FIGS. 3A-3C, 4A-4C, 5A-5C, and 6. During normal operation of power device 100, the voltages across the balanced capacitor terminals may be actively maintained to be equal between the two capacitors, such as by another circuit for monitoring the balance and forcing the voltage across the capacitors to be substantially equivalent. Each of the first and/or second capacitors C1 and/or C2 may be implemented as a capacitor bank comprising more than one capacitor connected in series and/or in parallel in each bank. A switching circuit, such as switching circuit 110, may be connected in parallel to both capacitors C1 and C2 using, for example, two or more switches and two or more diodes. The switching circuit 110 may be configured to connect, in turn, the auxiliary power input voltage Vaux to the second capacitor C2 or the first capacitor C1 while naturally (such as intrinsically) preserving the balance across the capacitors. The switching circuit allows connecting a second power converter to the capacitors without disrupting the balancing of the capacitors.

Following are practical examples of some applications of switching circuits 110 in power generation systems. Solar energy inverters are an application of power converters where the DC input voltages may be high (such as hundreds of volts or above 1000 volts), and many inverter designs may comprise two or more groups of balanced capacitors, where the groups are balanced between them in voltage or charge. Capacitors may be used at the input of power converters, where each capacitor may provide an energy reservoir to alternately pass energy to the power converter and be recharged by an input power source. The use of balanced capacitors may allow generation of both positive and negative current flows, such as generation of symmetrical AC from a DC current source, to the output, while a center connection point of the capacitors may serve as a reference point. Balancing the capacitors may provide symmetrical operation during both positive and negative current flows and may result in better magnetic component utilization (for example allowing smaller magnetics may be used), since the voltage and/or current stress across the components may be symmetrical.

When the input voltage is high, such as higher than 500 V, certain DC/DC converter topologies may be limited by low efficiency and a limited duty cycle, such as a small duty cycle. Other power converters may use two or more stages to reduce the voltage efficiently, for example, a first stage to reduce the voltage from 500 volts DC (VDC) to 100 VDC, and a second stage to reduce the voltage from 100 VDC to 12 VDC, such as for operating a controller circuit of the high-voltage converter. For example, a buck DC/DC converter may reduce an input voltage from 1000 VDC to 500 VDC, and a second stage flyback DC/DC converter may reduce the input voltage from 500 VDC to 250 VDC. Two-stage converter topologies may have an increased component count and a reduced efficiency relative to one stage.

For example, power devices for solar systems may be neutral point clamped (NPC) configuration inverters, flying capacitor inverters, or other topologies of multilevel or two-level inverters. These examples may be used for converting a 500 to 2000 VDC input power from strings of photovoltaic panels to a 240 volt alternating current (VAC) output. For example, an input voltage of up to 1000 VDC may be used to supply an inverter for 3-phase 220 VAC output. The inverters may comprise an capacitor balancing circuit to ensure that the two capacitors C1 and C2 are balanced. For example, an VAC output may be between 90 and 260 volts AC.

When a voltage across a first capacitor of the capacitors C1-Cn is lower than the voltage across a second capacitor of the capacitors C1-Cn by more than a threshold (such as when a difference between the voltages across those respective capacitors exceeds the threshold), such as determined by the diodes' forward voltage, switching circuit 110 may intrinsically prevent drawing current from the first capacitor. As an example, when the first capacitor has a first voltage V1 across it, and the second capacitor has a second voltage V2>V1 across it, switching circuit 110 may prevent drawing current from the first capacitor when the difference between V2 and V1 is greater than the threshold. The switching circuit 110 may, for example, replace the first stage of a two-stage voltage converter, which may increase efficiency, reliability, and cost-effectiveness. Thus the switching circuit 110 may naturally (such as passively—without active control or effort) preserve the voltage balance across the capacitors C1-Cn. In this manner, a second converter, one or more other switching circuits, and/or the like, may be connected in parallel to the capacitors C1-Cn, and the combined operation of all connected switching circuits may passively preserve the balance across the capacitors by drawing power from the capacitor(s) with the higher voltage(s).

For example, one of the capacitors C1-Cn (a "first" capacitor) may have a voltage of 550 VDC, and another of the capacitors C1-Cn (a "second" capacitor) may have a voltage of 525 VDC. When the switching circuit 110 connects the output capacitor Cs to the first capacitor in this example, the output capacitor Cs may be charged to a slightly lower voltage, such as due to charge balancing between the capacitors, for example 545 VDC, possibly reducing the first capacitor voltage to the same 545 VDC. When the switching circuit connects the output capacitor (at 545 VDC) to the second capacitor at 525 VDC, then no current will flow from the second capacitor to the output capacitor Cs. In this manner, during each switching cycle, the first capacitor voltage may decrease when connected to Cs by, for example, about 4 VDC (or by any other similar amount, depending on the capacitance values and voltages, such as an asymptotically decreasing value) until the first and second capacitors are balanced.

Figure 2A:
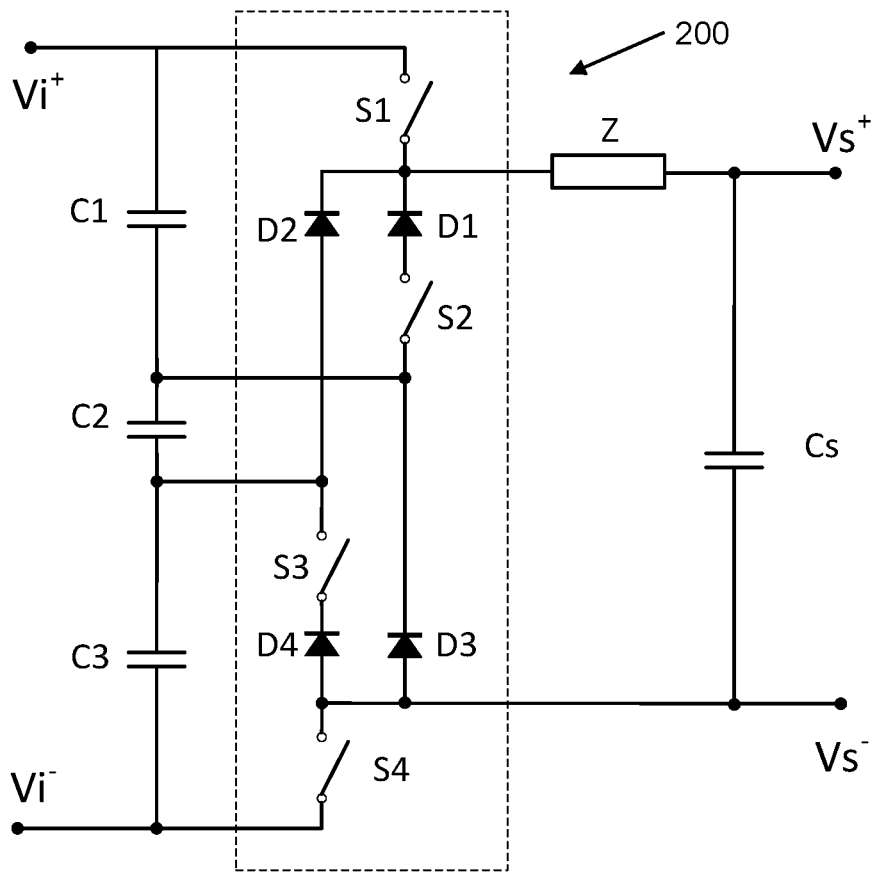
FIGS. 2A-2G show circuit diagrams of example switching circuits for three balanced capacitors, according to illustrative aspects of the disclosure.

Reference is now made to FIG. 2A, which shows a circuit diagram of an example switching circuit 200 for three balanced capacitors, according to illustrative aspects of the disclosure. Switching circuit 200 may be an example implementation of switching circuit 110 (FIG. 1). Capacitors C1, C2 and C3 (which may be an example of capacitors C1-Cn of FIG. 1, where n=3 in this example) may be connected in series to a DC voltage source Vi (between terminals Vi+ and Vi−), and the four terminals of the series connection (the two terminals of capacitor C1 and the two terminals of capacitor C3, with capacitor C2 connected between capacitor C1 and capacitor C3) are connected to a power converter (not shown) that may actively balance the voltages across each of capacitors C1, C2 and C3. In parallel to the power converter, switching circuit 200 may be connected to the series-connected capacitor terminals, and may present an output voltage Vs across terminals Vs+ and Vs− (which may be the same as terminals Vs+ and Vs− in FIG. 1). The switching circuit 200 may include switches S1, S2, S3, and S4 that, depending on their relative states, provide various configurations, for connecting to the output terminals Vs+ and Vs−, either one, two or all three of the voltages across the serially-connected capacitors C1, C2, and/or C3. Switching circuit 200 as shown herein comprises four diodes D1, D2, D3, and D4 and four switches S1, S2, S32, and S4. Diodes D1, D2, D3, and D4 may each be replaced with switches controlled to be ON when conduction is desired. An impedance Z (which may be the impedance of one or more components each having an impedance) and output capacitor Cs may be included in circuit 200 to assist in the stabilizing output voltage Vo.

Figure 2B:
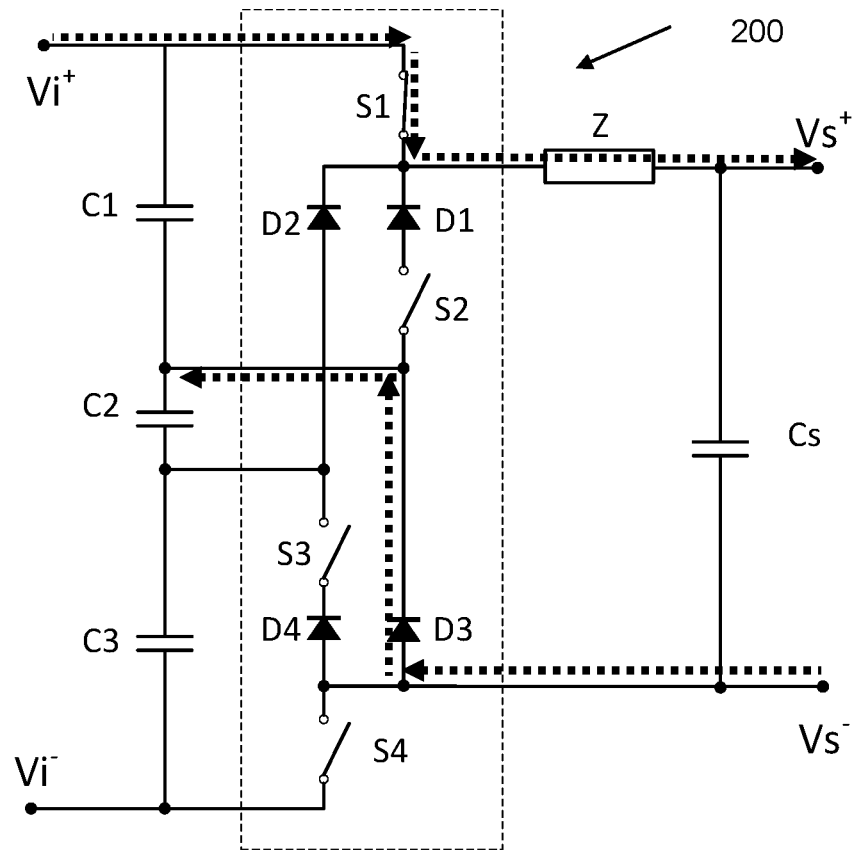

Reference is now made to FIG. 2B, which shows an example current flow for a particular switching configuration of switching circuit 200, with S1 closed (such as in a conducting state) and the other switches S2-S4 open (such as in a non-conducting state), according to illustrative aspects of the disclosure. Dashed lines indicate the current flow. Closing switch S1 electrically connects terminal Vi+ to terminal Vs+, and a return path for the current is from terminal Vs− to the terminal common between capacitors C1 and C2, such that the voltage of capacitor C1 is connected to Vs.

Figure 2C:
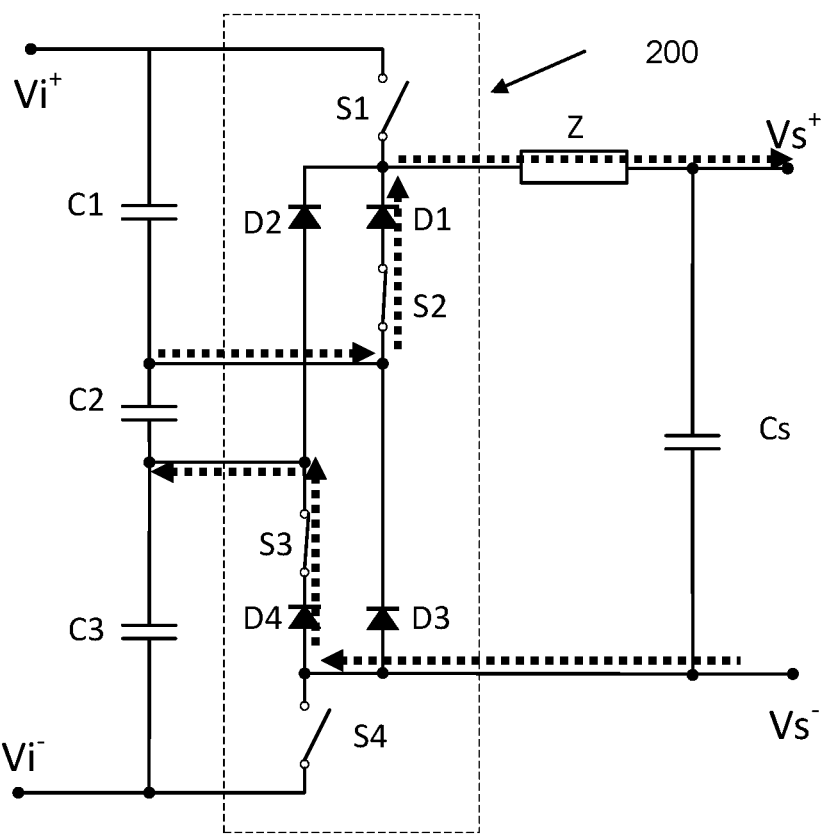

Reference is now made to FIG. 2C, which shows another example current flow for another particular switching configuration of switching circuit 200, with switches S2 and S3 closed and the other switches S1 and S4 open, according to illustrative aspects of the disclosure. Dashed lines indicate the current flow. Closing switch S2 electrically connects the terminal common between capacitors C1 and C2 to terminal Vs+, and closing switch S3 electrically connects the terminal common between capacitors C2 and C3 to terminal Vs−, so the voltage of capacitor C2 is connected to Vo.

Figure 2D:
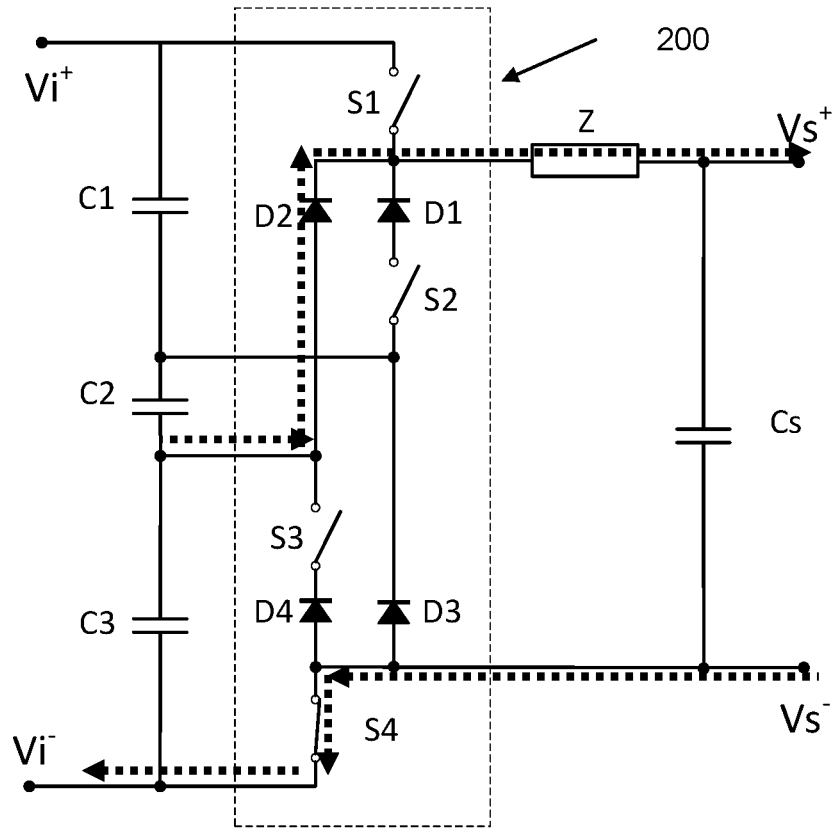

Reference is now made to FIG. 2D, which shows another example current flow for a particular switching configuration of switching circuit 200, with switch S4 closed and the other switches S1-S3 open, according to illustrative aspects of the disclosure. Dashed lines indicate the current flow. Closing switch S4 electrically connects terminal Vi− to terminal Vs−, and a current loop is created from the terminal common between capacitors C2 and C3 to terminal Vs+, so the voltage of capacitor C3 is connected to Vo.

Figure 2E:
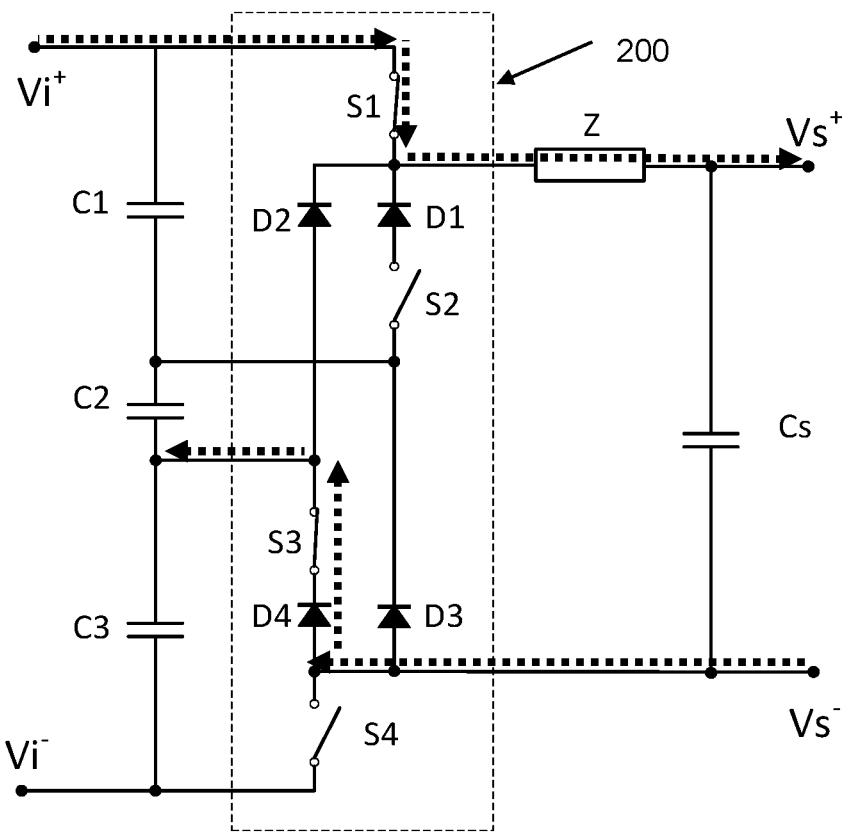

Reference is now made to FIG. 2E, which shows another example current flow for a particular switching configuration of switching circuit 200, with switches S1 and S3 closed and the other switches S2 and S4 open, according to illustrative aspects of the disclosure. Dashed lines indicate the current flow. Closing switch S1 electrically connects terminal Vi+ to terminal Vs+, and closing switch S3 electrically connects the terminal common between C2 and C3 to terminal Vs−. The sum of the voltages of capacitors C1 and C2 connected in series provides the output voltage Vs of switching circuit 200. Where impedance Z is not used, voltage Vs of switching circuit 200 is voltage Vs provided on terminals Vs+ and terminal Vs−.

Figure 2F:
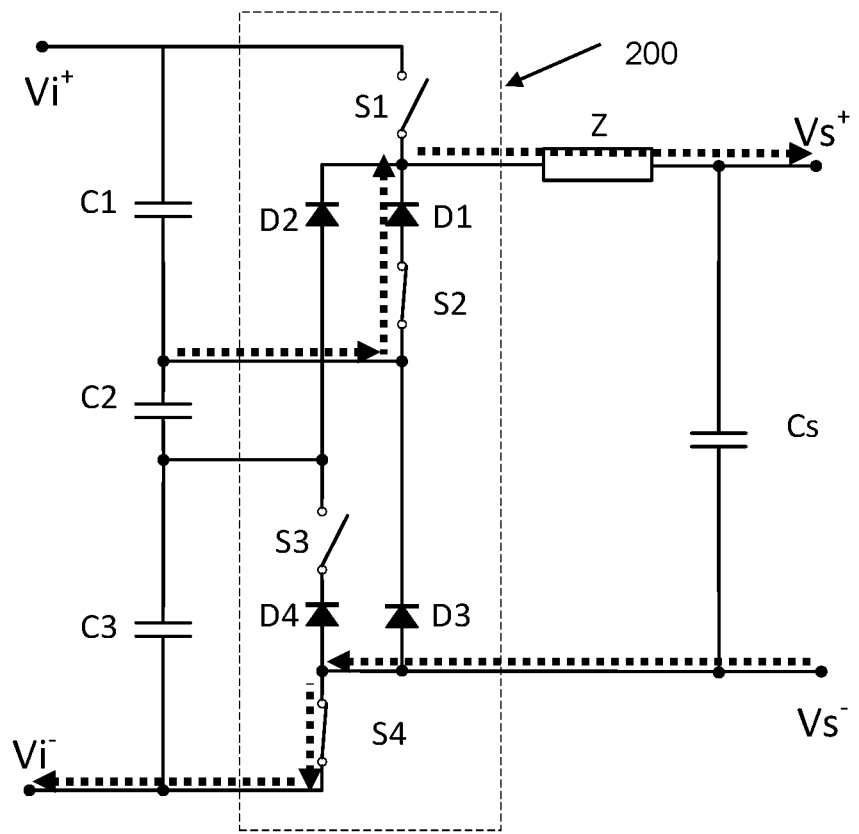

Reference is now made to FIG. 2F, which shows another example current flow for a particular switching configuration of switching circuit 200, with switches S2 and S4 closed and the other switches S1 and S3 open, according to illustrative aspects of the disclosure. Dashed lines indicate the current flow. Closing switch S2 electrically connects the terminal common between capacitors C1 and C2 to terminal Vs+, and closing switch S4 electrically connects terminal Vi-terminal terminal Vi− to terminal Vs−, so the voltage of capacitors C2 and C3 in series is connected to Vo.

Figure 2G:
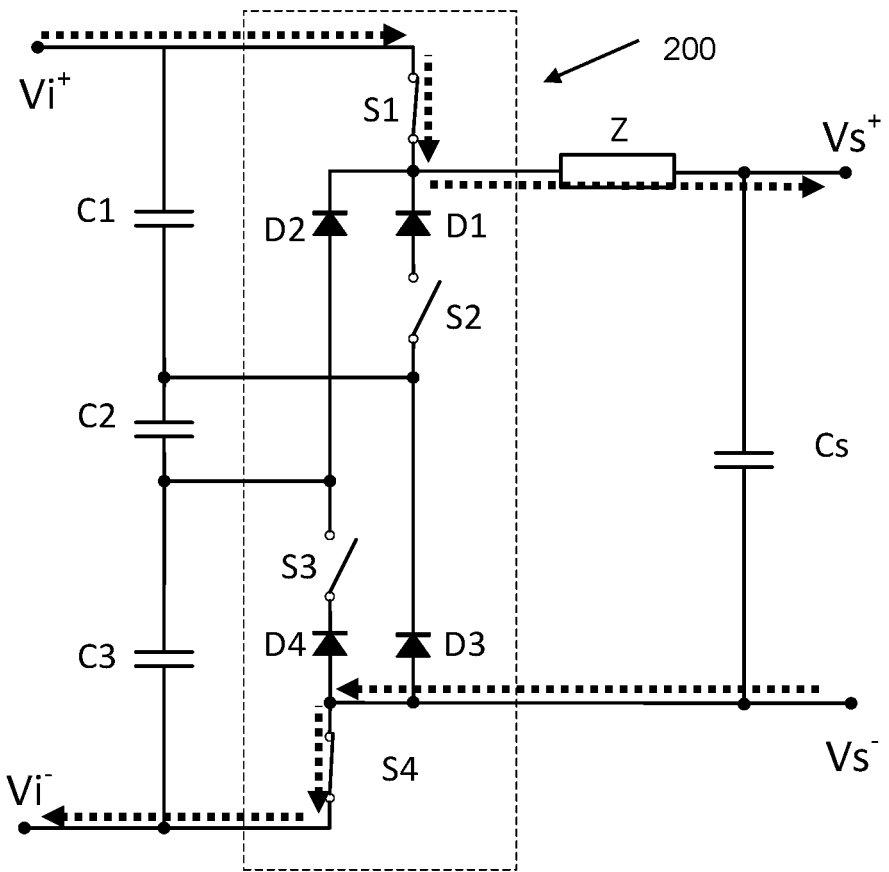

Reference is now made to FIG. 2G, which shows another example current flow for a particular switching configuration of switching circuit 200, with switches S1 and S4 closed and the other switches S2 and S3 open, according to illustrative aspects of the disclosure. Dashed lines indicate the current flow. Closing switch S1 electrically connects terminal Vi+ to terminal Vs+, and closing switch S4 electrically connects terminal Vi− to terminal Vs−, so that voltage Vi is connected to Vo.

Figure 3A:
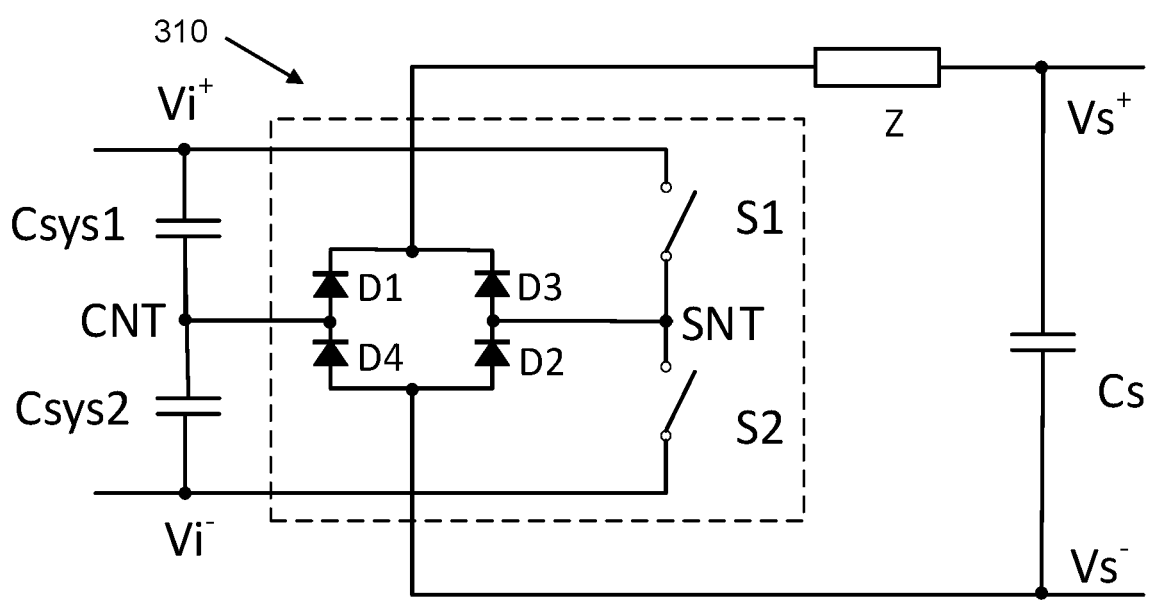
FIGS. 3A-3C show circuit diagrams of example switching circuits for balanced capacitors, according to illustrative aspects of the disclosure, according to illustrative aspects of the disclosure.

Reference is now made to FIG. 3A, which shows an illustrative circuit diagram of an example switching circuit 310 for balancing capacitors, according to illustrative aspects of the disclosure. Switching circuit 310 may be an example implementation of switching circuit 110 of FIG. 1. Capacitors Csys1 and Csys2 (which may be an example implementation of capacitors C1-Cn, where n=2, in FIG. 1), may be balanced capacitors connected in series across two terminals of an input voltage Vi, where a connection point CNT between the two capacitors may be a neutral point terminal, a mid-point voltage, a mid-voltage, a DC link voltage, and/or the like. The anode of diode D1 may be connected to CNT and the cathode is coupled to a positive terminal of an output voltage denoted Vo (denoted terminal Vs+), optionally through an impedance Z. While impedance Z may not be present in a particular circuit, where is it present, the impedance Z may be, for example, one or more components such as one or more resistors, inductors, capacitors, thermistors, resonant circuits, and/or the like. The cathode of diode D4 may be connected to CNT, and the anode of diode D4 may be connected to the negative terminal Vs− of the output voltage. A cathode of diode D3 may be connected to terminal Vs+ and to the cathode of diode D1, and an anode of D2 may be connected to terminal Vs− and to the anode of diode D4. An anode of diode D3 may be connected to the cathode of D2 at a switch neutral terminal (SNT). A first terminal (such as a source terminal, when switch S1 is a MOSFET) of switch S1 may be connected to SNT and a second terminal (such as a drain terminal) of S1 may be connected to terminal Vi+. A first terminal (such as a source terminal when switch S2 is a MOSFET) of switch S2 is connected to terminal Vi− and a second terminal (such as a drain terminal) of S2 may be connected to SNT and the first terminal of S1. An output capacitor Cs (such as a holdup capacitor) may be connected between the terminals of the output voltage (such as between terminals Vs+ and Vs−).

Figure 3B:
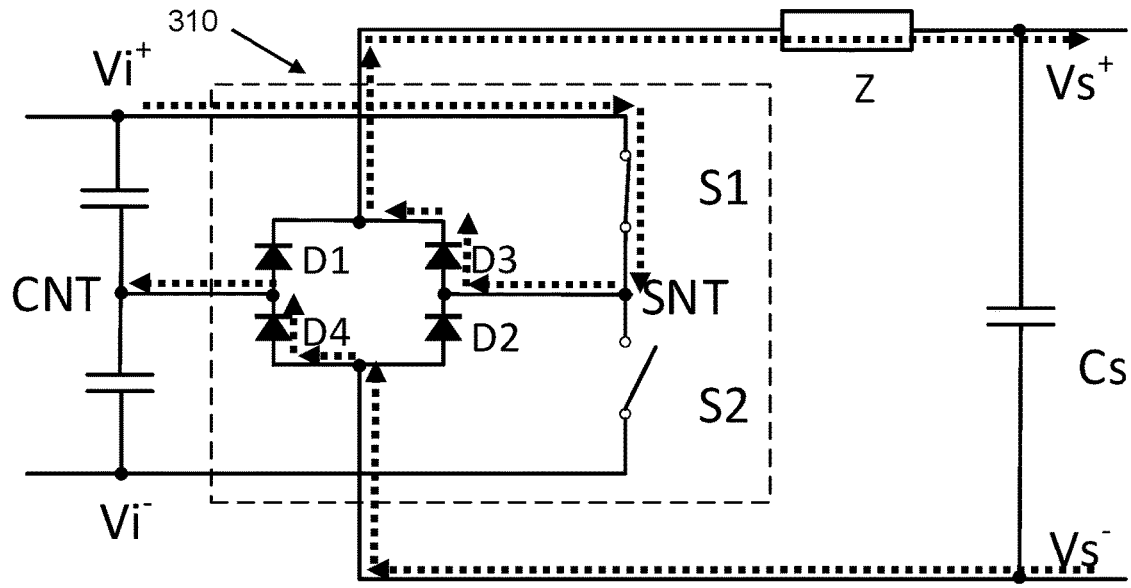

Reference is now made to FIG. 3B, which shows an example current flow in circuit 310, in which S1 is closed and S2 is open, according to illustrative aspects of the disclosure. Dashed lines indicate the current flow. Switches S1 and S2 may alternately connect between the terminals of one of the two balanced capacitors (which may each be a capacitor bank) Csys1 and Csys2 and the output voltage terminals, with a short dead time to inhibit a shoot-through current condition. For example, the dead time, such as a time when both of S1 and S2 are open, may be between 0.001 seconds and 1 second. A shoot-through current condition may occur when S1 and S2 are both closed, creating a short circuit condition. When S1 closes, the capacitors Csys1 voltage may be diverted through diode D3 and impedance Z to the output capacitor Cs. The impedance Z (like any of the other components described herein) is optional, and may reduce switching stresses and may increase noise filtration. When S1 opens for a short duration, Cs may be charged to the voltage of Csys1. In a balanced capacitor inverter design, such as a two-capacitor NPC inverter or the like (such as as in FIGS. 3A-3C), each capacitor Csys1 and Csys2 voltage may be about half of the total DC input potential (such as about half of the difference between Vi+ and Vi−) when the balanced condition exists.

From when S1 opens until S2 closes, the energy from capacitor Cs supplies the output voltage terminals Vs+ and Vs− with current to support the power consumption of a load connected across VS+ and Vs−, with a voltage of substantially half of the input voltage.

For example, the maximum ripple voltage across Cs may be dictated by the capacitance value of capacitor Cs, the output power, the control dead time and the switching frequency. A low switching frequency allows reduced losses, reduced electromagnetic interference, and/or the like. When impedance Z is used in the switching circuit, diodes D2 and D3 may be forward-biased and may maintain the current through Z during the dead time. A different impedance element may be used instead of Z (resistor R, capacitor C, inductor L, NTC, L+R, L+NTC or other combinations). Resistive elements are generally of lower cost and footprint and have the benefit of simple way to limit the inrush currents at the initial start of the switching circuit when Cs voltage starts to ramp from zero voltage.

The switching circuit may use as switching components various types of switches, such as a field-effect transistor (FET), a metal-oxide-semiconductor FET (MOSFET), an insulated-gate bipolar transistor (IGBT), a bipolar transistor, a power transistor, a solid-state relay, an electromechanical relay, and/or the like. The diodes of a switching circuit may be replaced with switches(e.g. transistors such as MOSFETs) and/or the like. The capacitors C1-Cn connected in series across the input voltage may comprise two capacitors, three capacitors, four capacitors, or more. The examples herein show the configuration when various numbers (such as two, three, or more) balanced capacitors are used in series across the input voltage, and the switching circuit 110 may be configured to switch between these one, two, or more of the input capacitors to the output. Other components, such as an output capacitor, an inductor, a resistor, and/or the like, may be needed, or not depending on the specific requirements of the applications and/or design. For example, the input voltage may have three balanced capacitors in series, and the switching circuit alternately connects any two of the input capacitors to the output. For example, the input voltage may have three balanced capacitors in series, and the switching circuit alternately connects one of the input capacitors to the output. As used herein, the term "gate" refers to a control terminal of a switch, such as but not limited to a gate of a MOSFET, a base of a bipolar junction transistor, or a control terminal of a relay. The use of the term "gate" is not intended to limit the technical solution to any particular type of switch. Thus, any of the switch controllers discussed herein may also be considered gate controllers where they control the gates of the switches.

The switching circuit 110 may have the benefit of using open loop control for the switching instead of a dedicated closed loop control processor-controlled circuit. The open loop topology may decrease complexity of the switching circuit 110, and may avoid using metal-oxide varistors or voltage surge suppressors for controlling the switching circuit. Generally, these components may have relatively low power transfer capabilities and low resulting efficiency when used in high power circuits. The switching circuit 110 may use a low switching frequency, such as less than 100 kilohertz (kHz). For example, the switching frequency may be less than 10 KHz, less than 1 KHz, less than 100 hertz (Hz), less than 10 Hz, less than 1 Hz, less than 0.1 Hz, and the like. For example, the switching circuit may be implemented using two alternating square waves at a fixed frequency of 10 kilohertz (kHz) and a fixed duty cycle of 45% (45 microseconds). Each square wave may control one switch, and a dead time of 10% (10 microseconds) may be applied to the circuit switches to prevent a bypass mode or shoot-through current conditions.

Figure 3C:
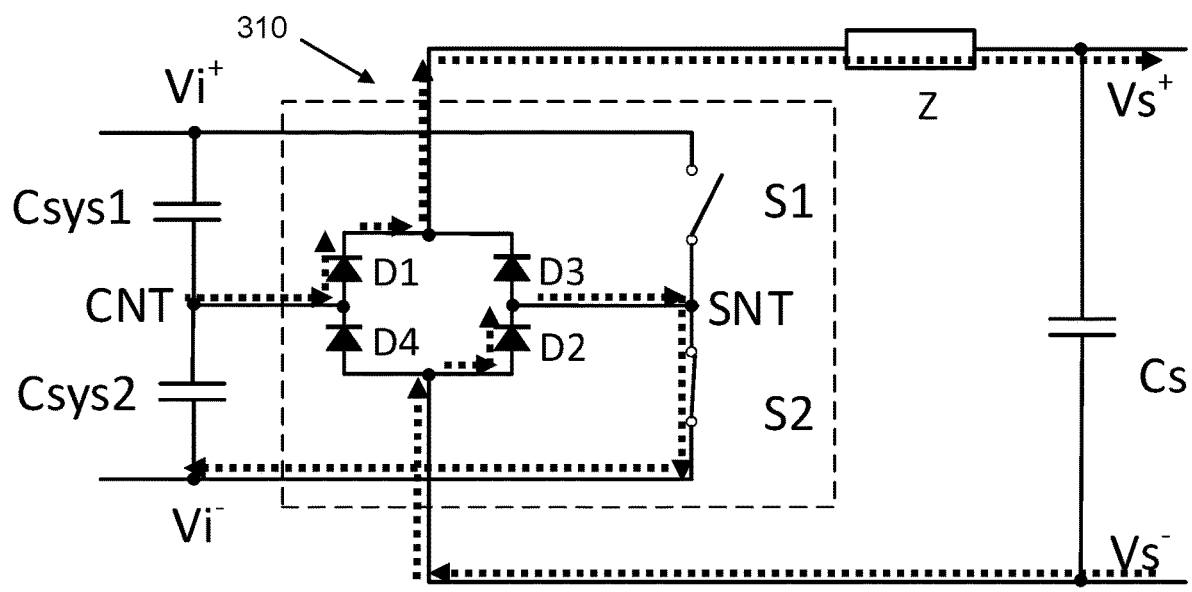

Reference is now made to FIG. 3C, which shows an example current flow in circuit 310, in which switch S1 is open and switch S2 is closed, according to illustrative aspects of the disclosure. Dashed lines indicate current flow. When switch S2 is closed, current from capacitor Csys2 may flow to the output terminals through diodes D1 and D2. Capacitor Cs and the bridge diodes D1-D4 maintain the peak voltage of the capacitors Csys1 and Csys2. When a mismatch in voltage between the capacitors Csys1 and Csys2 exceeds twice the diode forward voltage, the switching circuit may perform voltage balancing (e.g. passively), as power may be drawn from the capacitor Csys1 or Csys2 having the higher voltage until the mismatch is balanced (such as, until the voltage across the capacitors Csys1 and Csys2 is substantially equal).

Figure 4A:
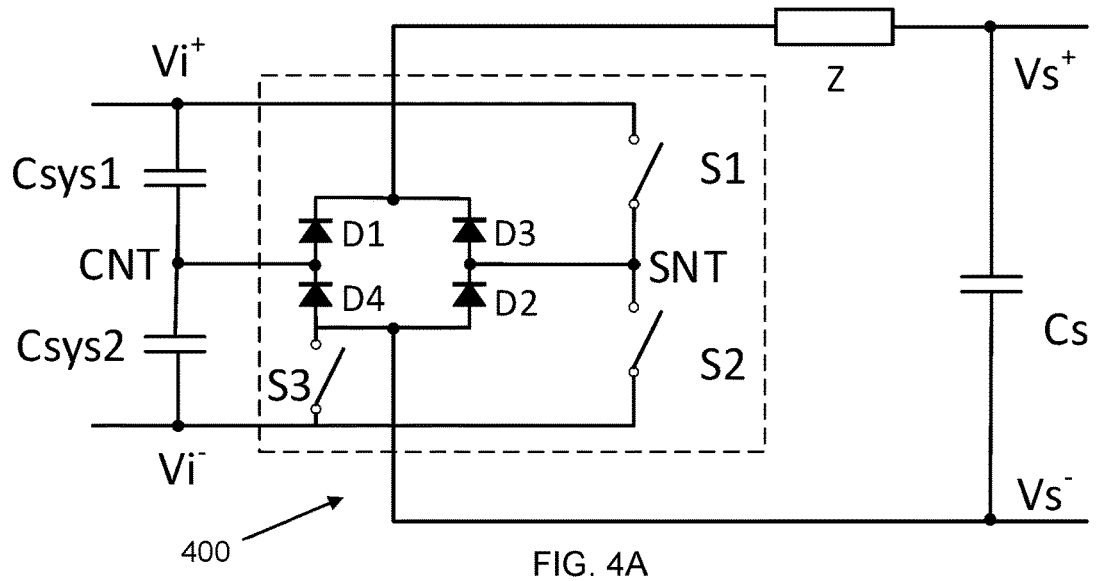
FIGS. 4A-4C show circuit diagrams of example switching circuits for balanced capacitors, according to illustrative aspects of the disclosure.

Reference is now made to FIG. 4A, which shows a circuit diagram of an example switching circuit 400 for balancing capacitors, according to illustrative aspects of the disclosure. Switching circuit 400 may be an example implementation of switching circuit 110 of FIG. 1, and is similar to switching circuit 310 (FIG. 3A) except that a third switch S3 may be included. In power devices where the input voltage range is dynamic, the third switch S3 may be used to supply the input voltage directly to the output voltage.

Figure 4B:
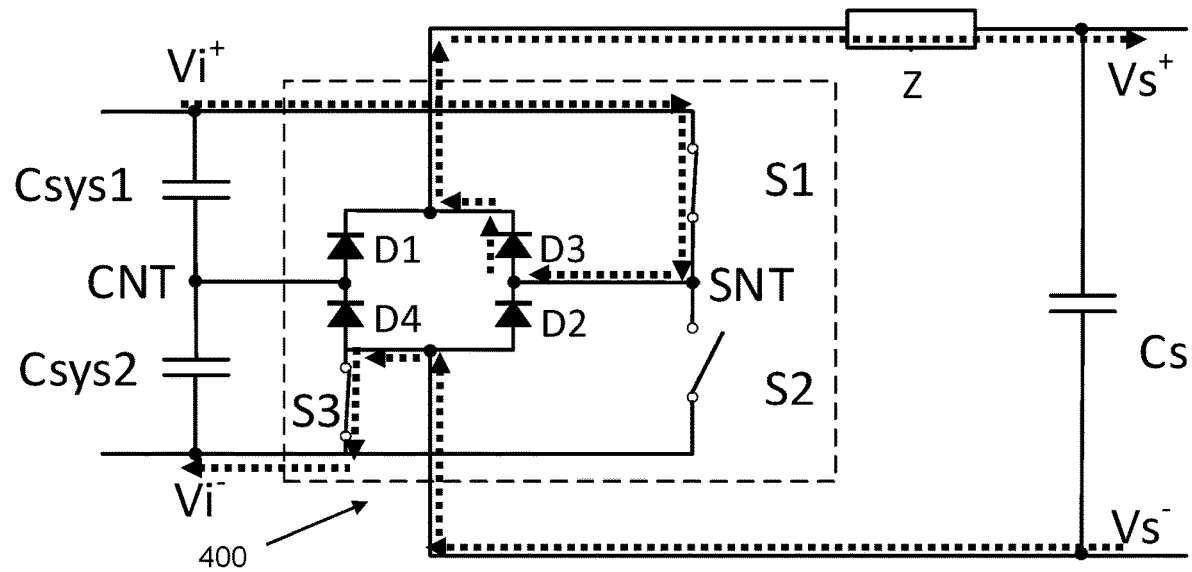

Reference is now made to FIG. 4B, which shows an example current flow in circuit 400 with switches S1 and S3 closed and switch S2 open, according to illustrative aspects of the disclosure. Dashed arrows indicate current flow. Closing switch S3 together with switch S1 may connect the full input voltage across both capacitors Csys1 and Csys2 to Cs, such as by connecting terminal Vi− to terminal Vs−. In this condition, switch S2 may be kept off (open) to inhibit a shoot-through current condition.

Figure 4C:
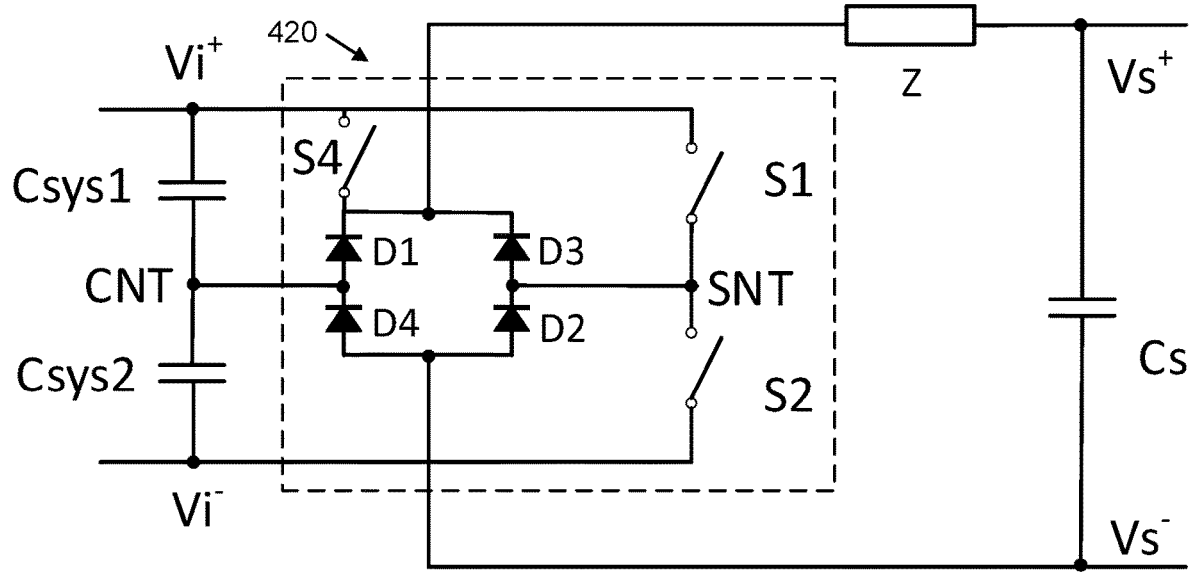

Reference is now made to FIG. 4C, which shows a circuit diagram of an example switching circuit 420 for balancing capacitors, according to illustrative aspects of the disclosure. Switching circuit 420 may be an example implementation of switching circuit 110 of FIG. 1, and is similar to switching circuit 400 (FIG. 4A) except that third switch S3 may be replaced with (or supplemented with) switch S4 as shown. Switch S4 may be located between terminal Vi+ to terminal Vs+, thereby enabling connecting the full input voltage Vi to Cs. A first configuration of the switches in FIG. 4C may allow the alternating connection of one of the capacitors to the output capacitor, and a second configuration of the switches may allow connecting the full input voltage to the output capacitor. The first configuration may be used as desired, for example when the input voltage is above a voltage threshold, such as 600 VDC. The second configuration may also be used as desired, for example, when the input voltage is below the threshold voltage.

Figure 5A:
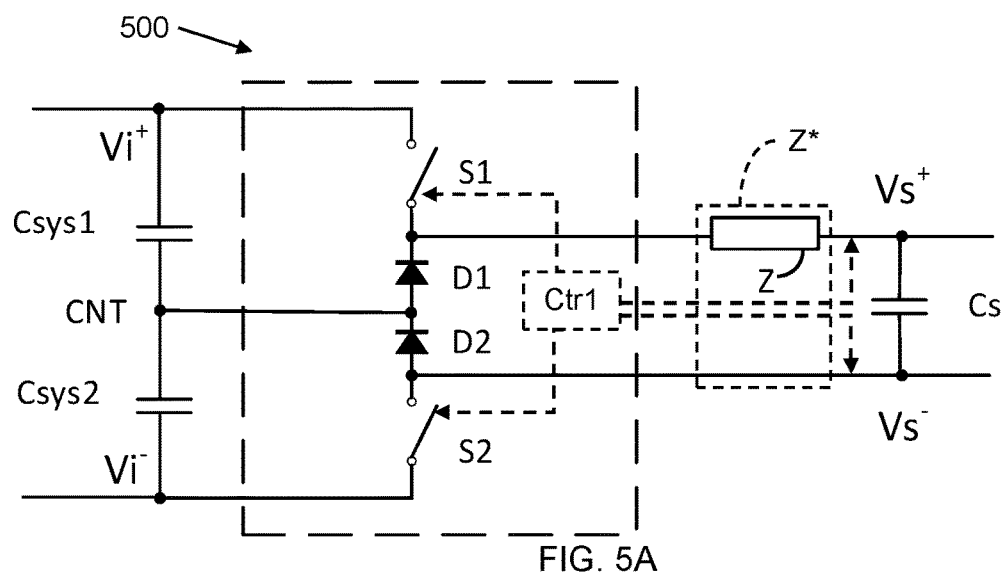
FIGS. 5A-5C show circuit diagrams of example switching circuits for balanced capacitors, according to illustrative aspects of the disclosure.

Reference is now made to FIG. 5A, which shows a circuit diagram of an example switching circuit 500 for balanced capacitor, according to illustrative aspects of the disclosure. Switching circuit 500 may be an example implementation of switching circuit 110 of FIG. 1. Switching circuit 500 may be implemented with a lower component count and may offer a control line that inhibits a shoot-through current possibility when switches S1 and S2 close together. To draw input power from the balanced capacitors (which may each be capacitor banks) Csys1 and/or Csys2, switches S1 and S2 may be alternatingly switched between on and off with a small dead time in between. Impedance Z may be included, such as a coil, inductor, resistor, and/or the like. Diodes D1 and D2 may direct the current to flow from capacitors Csys1 and/or Csys2, depending on the configuration of the switches S1 and/or S2. When a regulated voltage output is specified for the switching circuit 500 (such as to avoid including a separate DC-DC converter), a switching controller Ctr1 may be included that senses the voltage difference between Vs+ and Vs−, and operates switches S1 and S2 so that the voltage difference is constant and regulated. In an example where the switching circuit is combined with a buck converter in this manner, impedance Z may be or otherwise include an inductor. Similarly, a transformer may be used between Vs+ and Vs− together with a diode as at Z*, where these impedance components are configured to provide a flyback converter combined into the switching circuit 500. A flyback switching circuit may use a controller similar to Ctr1 but configured for a flyback impedance arrangement Z*. In similar manner, impedance Z* and controller Ctr1 may be configured for other types of converters combined into the switching circuit 500. Incorporating the converter into the switching circuit 500 has multiple potential benefits, including potentially reducing the number, ratings, and/or size of components, potentially reduced heat requirements, potentially higher density solutions, and/or the like.

Figure 5B:
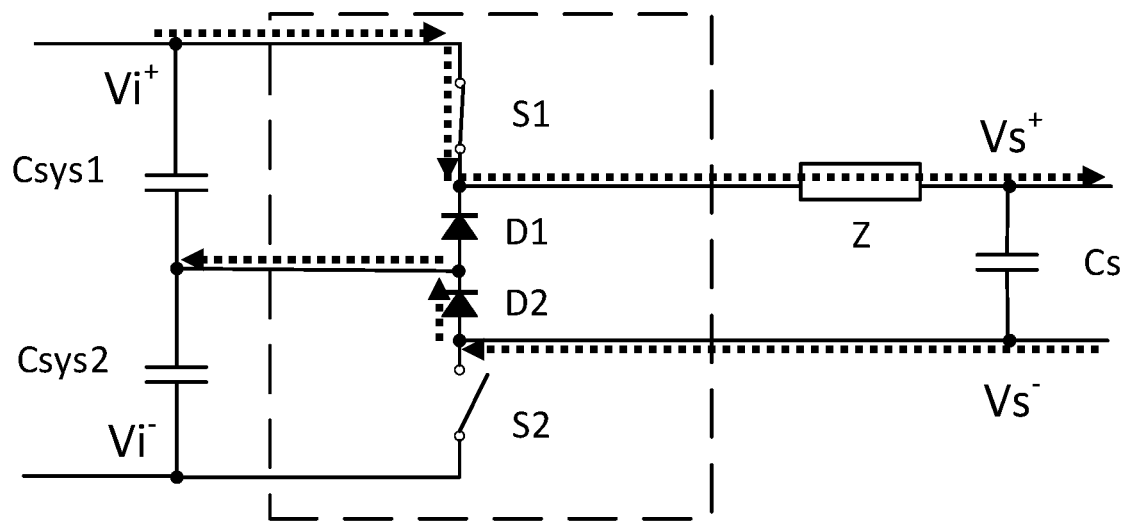

Reference is now made to FIG. 5B, which shows an example current flow in switching circuit 500 with switch S1 closed and switch S2 open, according to illustrative aspects of the disclosure. Dashed arrows indicate current flow. When switch S1 closes and switch S2 is open, Cs may be charged through impedance Z and diode D2 to the potential of Csys1 (minus the diode forward voltage). Impedance Z may assist in achieving lower switching stresses and better filtering.

Figure 5C:
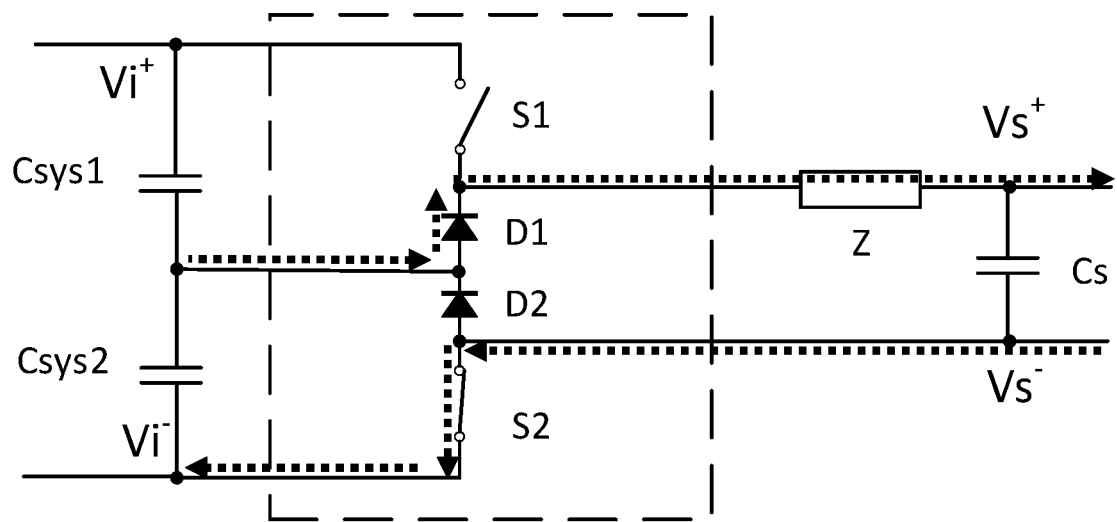

Reference is now made to FIG. 5C, which shows an example current flow in switching circuit 500 with switch S1 open and switch S2 closed, according to illustrative aspects of the disclosure. Dashed lines indicate the current flow. When switch S2 closes and switch S1 is open, Cs may charge to the capacitor Csys2 potential through diode D1 and impedance Z. During the dead time in between the ON (switch closed) intervals of S1 and S2, Cs may supply the current to Vaux, such as between Vs+ and Vs−. When impedance Z is incorporated in the circuit 500 as an inductor, for example, the current of the inductor may freewheel through diodes D1 and D2. When a 1:1 input to output voltage ratio is desired, for example, switches S1 and S2 may be closed together.

Besides a lower component count, the circuit 500 of FIGS. 5A and 5B may also provide a shorter (such as an almost zero) dead time between the switching. When both switches S1 and S2 are closed, the result may be a that the full input voltage may be applied to capacitor Cs, thus potentially preventing a shoot through condition.

Figure 6A:
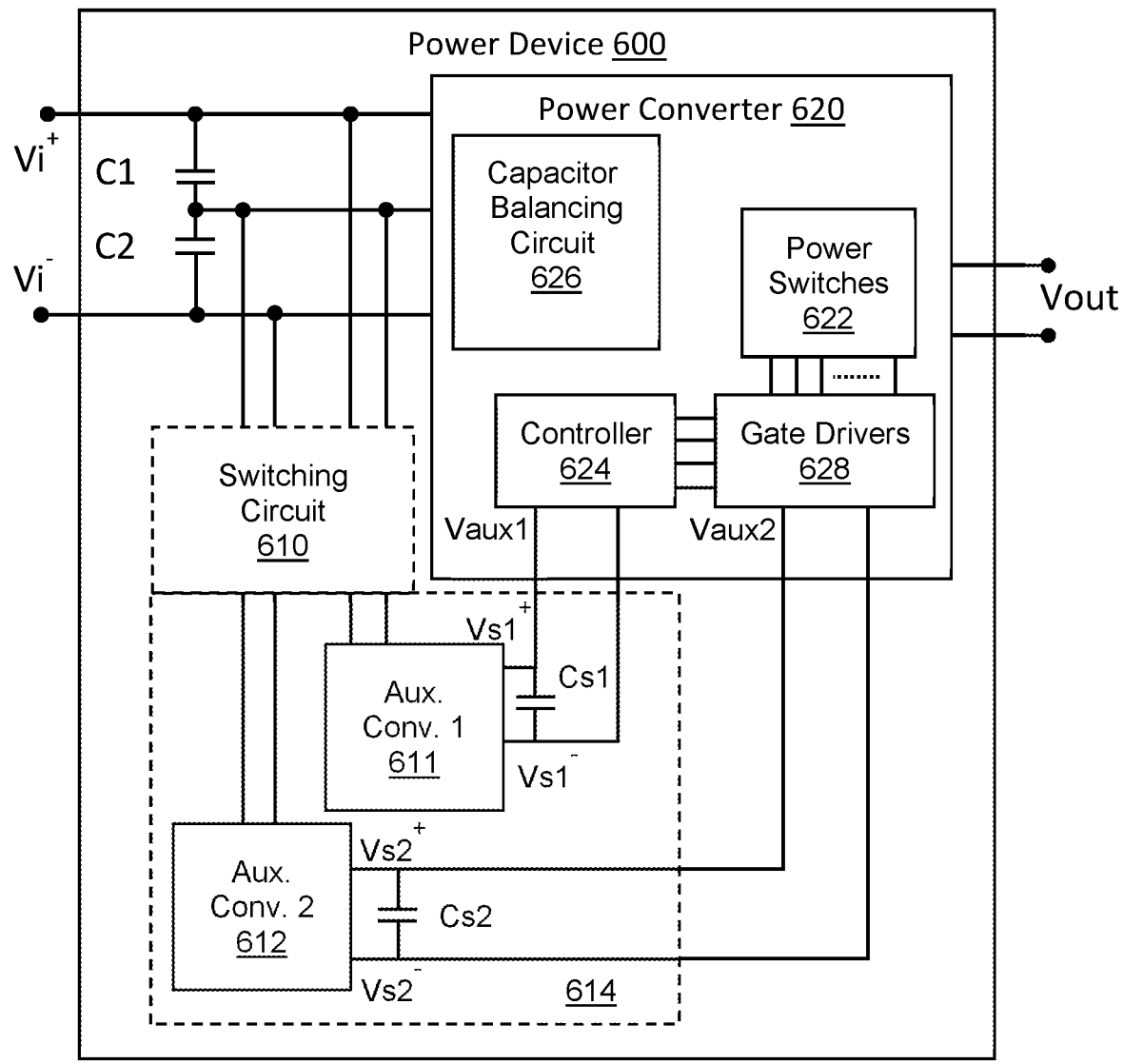
FIG. 6A shows a circuit diagram of an example switching circuit for dual auxiliary power converters connected to balanced capacitors, according to illustrative aspects of the disclosure.

Reference is now made to FIG. 6A, which shows, schematically, an example power device 600 and an example switching circuit 610 for dual auxiliary power converters connected to a plurality of balanced serially-connected capacitors, according to illustrative aspects of the disclosure. Similar to power device 100, power device 600 may accept an input voltage from terminals Vi+ and Vi−, and may produce an output voltage Vout. Power device 600 uses balanced capacitors C1-Cn (where n=2 in this example), and thus uses two balanced capacitors C1 and C2 in series with each other, and a power converter 620 to convert the input voltage to Vout. Power converter 620 may comprise a capacitor balancing circuit 626, a plurality of power switches 622, a controller 624, and a plurality of gate drivers 628. Controller 624 may operate using an axillary voltage Vaux1 and gate drivers may operate using an auxiliary voltage Vaux2. Vaux1 may be supplied from a first auxiliary converter 611 and Vaux2 may be supplied from a second auxiliary converter 612. Switching circuit 610 may alternate auxiliary converters 611 and 622 between serially-connected capacitors (e.g., between capacitors C1 and C2) so as to prevent excessive drain of any of the capacitors. Similarly, auxiliary converters 611 and 612 may be incorporated into switching circuit 610 using a switching controller that senses Vaux1 and Vaux2 and that controls the switches of switching circuit 610 to regulate constant output voltages Vaux1 and Vaux2. The switching converter circuit 614 incorporates at least some of the components of the converters 611 and 612 into switching circuit 610, thereby reducing components in the combined solution. For example, a buck converter combined into switching circuit 610 may use a serial inductor, and an included switching gate controller may be configured to control the gates of switching circuit 610 so that Vaux1 and Vaux2 are constant up to a maximum current. Power device 600 may be another example of how power device 100 may be implemented. Power converter 620 may be an example of power converter 120. Switching circuit 610 may be, for example, any of the previously-described switching circuits 110, 200, 310, 400, or 500. Capacitor balancing circuit 626 may be, for example, capacitor balancing circuit 126. Power switches 622 may be, for example, power switches 122. Controller 624 and/or gate drivers 628 may be, for example, switch controller 124.

Figure 6B:
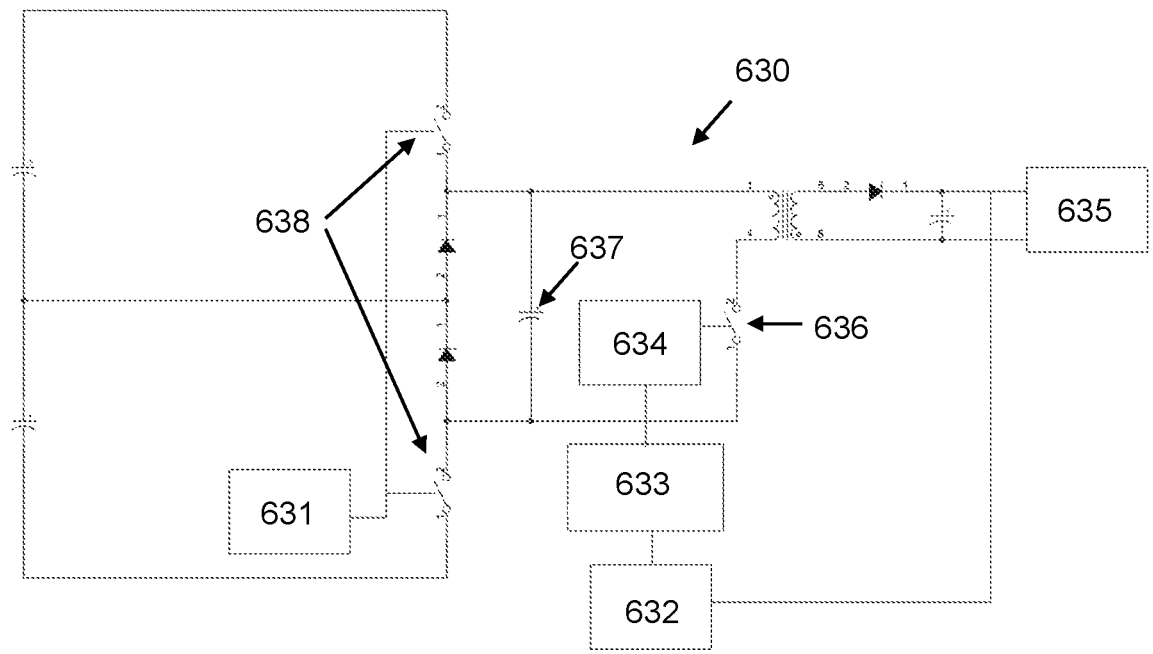
FIG. 6B shows circuit diagrams of example switching circuits for balanced capacitors and a flyback converter, with and without combining, according to illustrative aspects of the disclosure.
Figure 6B:
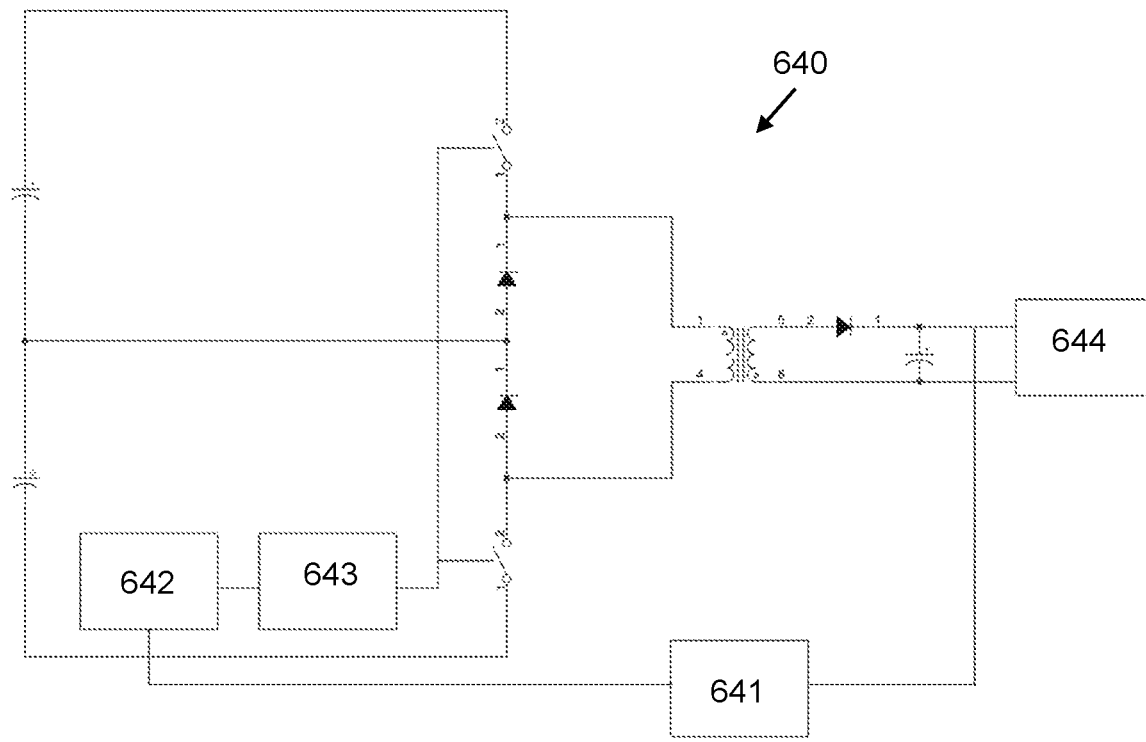

Reference is now made to FIG. 6B, which shows a circuit diagram of an example switching circuit for a plurality of balanced capacitors and a flyback converter, shown at the top (circuit diagram 630) without combining and shown at the bottom (circuit diagram 640) with combining, according to illustrative aspects of the disclosure. The switching circuits in circuit diagrams 630 and 640 may be used as the switching circuit in any of the other drawings and examples provided in the present disclosure, including but not limited to any of switching circuits 110 and 610. Circuit diagram 630 includes an example switching circuit with controller/drivers 631 operating in an open loop switching control, such as a fixed frequency and duty cycle switching control. The switching circuit of circuit diagram 630 includes an output capacitor 637 and switches 638. Subsequent to the switching circuit, a flyback converter is provided for supplying a regulated output to a load 635. The flyback converter includes a feedback circuit 632, a controller 633, a driver 634, and a switch 636. The combined circuit diagram 640 comprises a switching circuit and flyback converter for supplying a regulated output to a load 644, a feedback circuit 641 that monitors the output voltage, a controller 642 that determines a switching paradigm (such as a frequency, duty cycle, waveform, and/or the like), and a driver 643 that receives a signal based on the switching paradigm and operates the switches in accordance with that signal. Combining the switching circuit and flyback converter, as shown for example in the circuit diagram 640, may involve configuration of the components and circuits, but may save components overall as compared with the circuit diagram 630, such as by allowing a switch (e.g., switch 636) and a capacitor (e.g., output capacitor 637) to be left out.

Figure 6C:
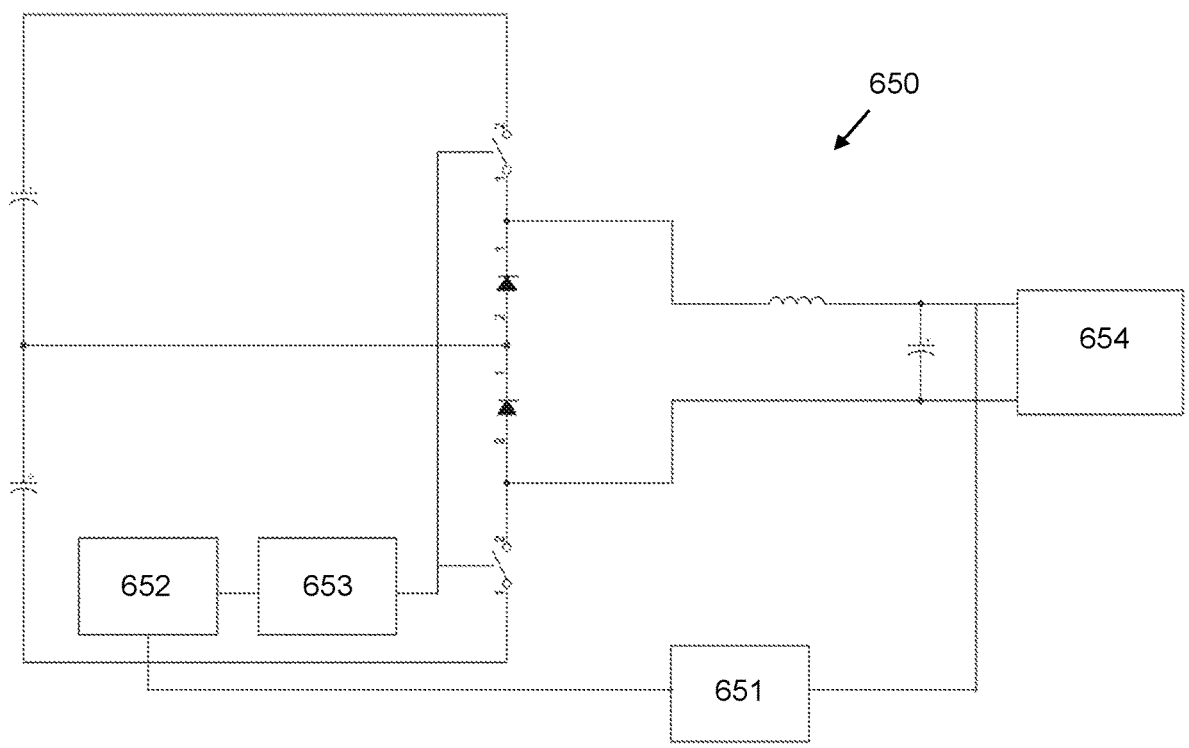
FIG. 6C shows circuit diagrams of example switching circuits for balanced capacitors combined with a buck converter, according to illustrative aspects of the disclosure.

Reference is now made to FIG. 6C, which shows a circuit diagram 650 of an example switching circuit for a plurality of balanced capacitors integrated with a buck converter, according to illustrative aspects of the disclosure. The switching circuit in circuit diagram 650 may be used as the switching circuit in any of the other drawings and examples provided in the present disclosure, including but not limited to any of switching circuits 110 and 610. In a combined switching circuit and buck converter for supplying a regulated output to a load 654, a feedback circuit 651 monitors the output voltage, a controller 652 determines a switching paradigm (such as a frequency, duty cycle, waveform, or the like), and a driver 653 receives a signal based on the switching paradigm and operates the switches in accordance with the signal. Combining the switching circuit and flyback converter may involve configuration of the components and circuits, but may save components overall, similar to combined flyback circuit of FIG. 6B.

Figure 7:
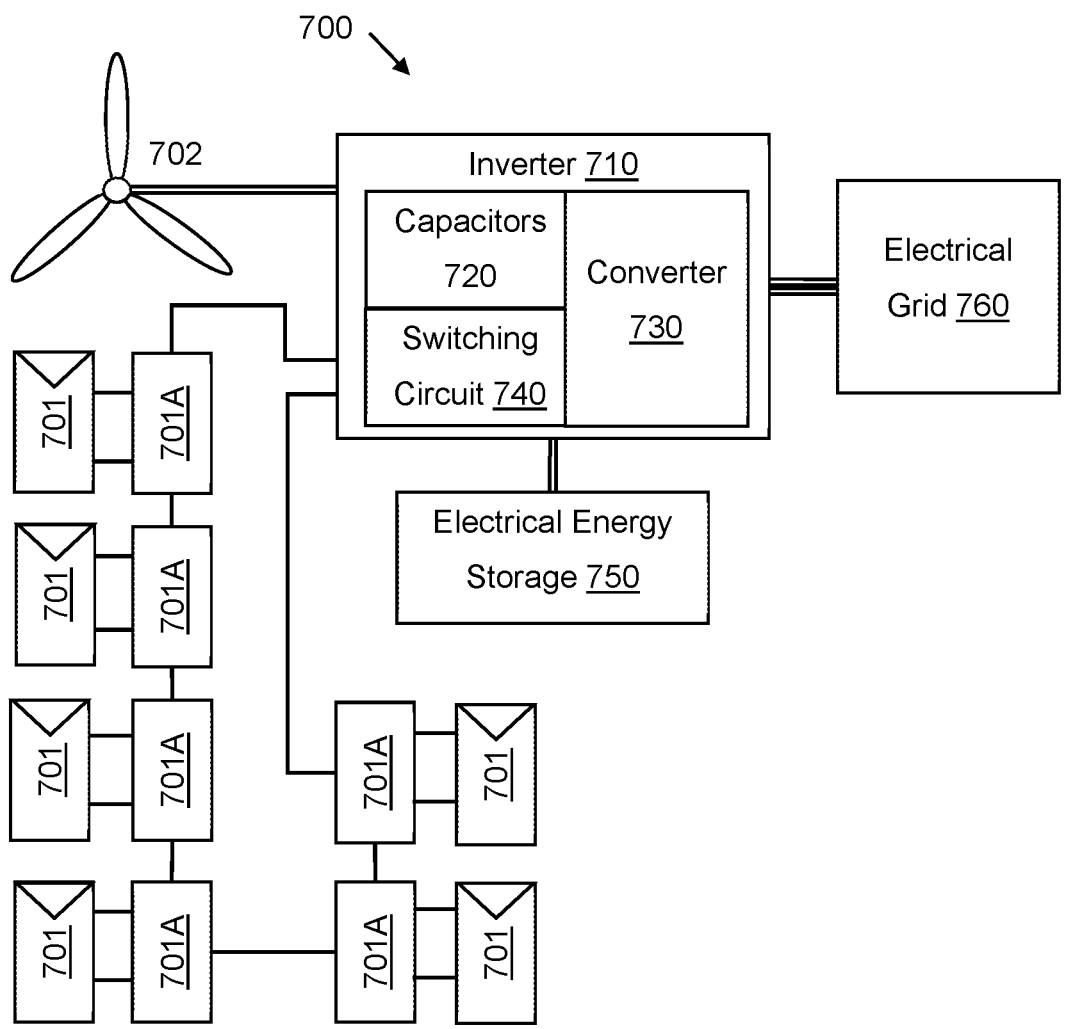
FIG. 7 shows schematically an example system for power generation comprising a switching circuit connected to converter-balanced capacitors, according to illustrative aspects of the disclosure.

Reference is now made to FIG. 7, which shows, schematically, an example system 700 for power generation comprising an example switching circuit 740 connected to converter 730 balanced capacitors 720, according to illustrative aspects of the disclosure. In this example, power device 100 or power device 600 may be an inverter 710. Inverter 710 may comprise switching circuit 740 (which may be, such as any of the previously-discussed switching circuits 110, 200, 310, 400, 500, 610, 630, 640, or 650), balanced capacitors 720 (which may be, for example, the previously-discussed balanced capacitors C1-Cn), and converter 730 (which may be, for example, power converter 120 or power converter 620) for converting power (such as DC power) from one or more solar panels 701 using power optimizers 701A, and/or power (such as AC power) from wind turbines 702 and/or the like, to DC and/or AC power at the output of converter 730. The converted power output by converter 730 may be used, for example, for charging an electrical storage device 750 (such as a battery, a compressed air electrical storage, a thermal electrical storage, and/or the like), as AC power for feeding into an electrical grid 760, and/or for any other purpose.

Here, as elsewhere in the specification and claims, ranges can be combined to form larger ranges, and any particular values described are non-limiting examples.

For example, specific dimensions, specific materials, specific ranges, specific resistivities, specific voltages, specific shapes, and/or other specific properties and values disclosed herein are illustrative in nature and are not intended to limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (for example, the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

In the description of various illustrative features, reference is made to the accompanying drawings, which form a part hereof, and in which show, by way of illustration, various features in which aspects of the disclosure may be practiced. It is to be understood that other features may be utilized and structural and functional modifications may be made, without departing from the scope of the present disclosure.

Terms such as "multiple" as used in this disclosure indicate the property of having or involving several parts, elements, or members.

It may be noted that various connections are set forth between elements herein. These connections are described in general and, unless specified otherwise, may be direct or indirect; this specification is not intended to be limiting in this respect, and whenever a connection is described, both direct and indirect connections are envisioned. Further, elements of one feature in any of the examples may be combined with elements from other features in any of the examples, in any combinations or sub-combinations.

As used herein, a discussion of two elements being connected or coupled together is intended to include direct electrical connection, and also indirect electrical connection in which one or more intervening elements (such as but not limited to a diode, resistor, and/or fuse) may be disposed in the electrical path connecting the two elements.

What is claimed is:

1. A power device comprising:
    a plurality of capacitors connected in series with each other and configured to be connected in parallel with a direct current (DC) power source;
    a first converter directly connected to terminals of the plurality of capacitors and configured to actively balance voltages across the plurality of capacitors using a closed loop control; and
    a second converter comprising:
        at least three input conductors each directly connected to a respective one of the terminals of one of the plurality of capacitors;
        at least two output conductors configured to provide an output voltage; and
        a switching circuit connected between the at least three input conductors and the at least two output conductors, wherein the switching circuit comprises at least two diodes or at least two switches, and wherein the at least two diodes or the at least two switches are configured to direct a current from at least one of the plurality of capacitors to the at least two output conductors,
    wherein the second converter is configured to:
        operate the switching circuit;
        generate the output voltage based on the voltages across the plurality of capacitors; and
        passively balance the voltages across the plurality of capacitors using an open loop control, wherein the open loop control comprises a fixed frequency and a fixed duty cycle.

2. The power device of claim 1, wherein the second converter is configured to operate the switching circuit at a frequency of less than 10,000 hertz.

3. The power device of claim 1, wherein the at least two diodes or the at least two switches are configured to electrically connect, in turn, each of the plurality of capacitors to the at least two output conductors.

4. The power device of claim 1, wherein the at least three input conductors comprise a low voltage conductor, a high voltage conductor, and a mid-voltage conductor.

5. The power device of claim 1, wherein the at least two diodes or the at least two switches comprise the at least two diodes and the at least two switches,
    wherein the at least two diodes comprise:
        a first diode; and
        a second diode;
    wherein the at least two switches comprise:
        a first switch; and
        a second switch,
    wherein the at least three input conductors comprise:
        a low-voltage conductor of the plurality of capacitors;
        a mid-voltage conductor of the plurality of capacitors; and
        a high-voltage conductor of the plurality of capacitors, and
    wherein:
        a source terminal of the first switch is connected to the low-voltage conductor of the plurality of capacitors,
        an anode terminal of the first diode is connected to a drain terminal of the first switch,
        a cathode terminal of the first diode and an anode terminal of the second diode are connected to the mid-voltage conductor of the plurality of capacitors, a cathode terminal of the second diode is connected to a source terminal of the second switch, and a drain terminal of the second switch is connected to the high-voltage conductor of the plurality of capacitors.

6. The power device of claim 1, wherein the at least two diodes or the at least two switches comprise the at least two diodes and the at least two switches, wherein the at least two diodes comprise a diode bridge comprising an anode terminal, a cathode terminal, a first alternating current terminal, and a second alternating current terminal, wherein the at least two switches comprise:
a first switch; and
a second switch, wherein the at least two output conductors comprise:
a low-voltage output conductor; and
a high-voltage output conductor, wherein the at least three input conductors comprise:
a low-voltage conductor of the plurality of capacitors;
a mid-voltage conductor of the plurality of capacitors; and
a high-voltage conductor of the plurality of capacitors, and wherein:
a source terminal of the first switch is connected to the low-voltage conductor of the plurality of capacitors,
the cathode terminal of the diode bridge is connected to the high-voltage output conductor,
the anode terminal of the diode bridge is connected to the low-voltage output conductor,
a drain terminal of the first switch is connected to the source terminal of the second switch and the first alternating current terminal of the diode bridge,
the second alternating current terminal of the diode bridge is connected to the mid-voltage conductor of the plurality of capacitors, and
a drain terminal of the second switch is connected to the high-voltage conductor of the plurality of capacitors.

7. The power device of claim 1, wherein the switching circuit is configured to switch the terminals of the plurality of capacitors between a plurality of DC to DC power supplies, each of the DC to DC power supplies configured to provide a voltage and a current to the first converter, and wherein the switching circuit is configured to preserve a balance amongst the voltages across the plurality of capacitors.

8. The power device of claim 1, wherein the plurality of capacitors comprises three capacitors, the at least three input conductors comprise four input conductors, and the switching circuit comprises four diodes and four switches.

9. The power device of claim 1, wherein the plurality of capacitors comprises a plurality of DC-link capacitors.

10. The power device of claim 1, wherein each of the plurality of capacitors comprises a capacitor bank.

11. A method comprising:
actively balancing, by a first converter directly connected to terminals of a plurality of capacitors, and using a closed-loop control, voltages across the plurality of capacitors that are connected in series with each other and that are connected in parallel with a direct current (DC) power source;
generating, by a second converter that comprises at least three input conductors each directly connected to a respective one of the terminals of one of the plurality of capacitors, an output voltage across at least two output conductors and based on the voltages across the plurality of capacitors; and passively balancing, by the second converter, the voltages across the plurality of capacitors using an open loop control of a switching circuit connected between the at least three input conductors and the at least two output conductors, wherein the open loop control comprises a fixed frequency and a fixed duty cycle, and wherein passively balancing the voltages across the plurality of capacitors comprises controlling at least two diodes of the switching circuit or at least two switches of the switching circuit to direct a current from at least one of the plurality of capacitors to the at least two output conductors.

12. The method of claim 11, wherein using the open loop control comprises electrically connecting, in turn, each of the plurality of capacitors to the output voltage using the at least two switches.

13. The method of claim 12, wherein the electrically connecting in turn is performed at a frequency of less than 10,000 hertz.

14. The method of claim 12, wherein the electrically connecting in turn is performed at a frequency of less than 1,000 hertz.

15. The method of claim 11, wherein the at least three input conductors comprises a low voltage conductor, a high voltage conductor, and a mid-voltage conductor.

16. The method of claim 11, wherein the plurality of capacitors comprises three capacitors, the at least three input conductors comprise four input conductors, and the switching circuit comprises four diodes and four switches.

17. The method of claim 11, wherein the plurality of capacitors comprises a plurality of DC-link capacitors.

18. The method of claim 11, wherein each of the plurality of capacitors comprises a capacitor bank.

19. The method of claim 11, wherein the at least two diodes or the at least two switches comprise the at least two diodes and the at least two switches, wherein the at least two diodes comprise:
a first diode; and
a second diode, wherein the at least two switches comprise:
a first switch; and
a second switch, wherein the at least three input conductors comprise:
a low-voltage conductor of the plurality of capacitors;
a mid-voltage conductor of the plurality of capacitors; and
a high-voltage conductor of the plurality of capacitors, and wherein:
a source terminal of the first switch is connected to the low-voltage conductor of the plurality of capacitors,
an anode terminal of the first diode is connected to a drain terminal of the first switch,
a cathode terminal of the first diode and an anode terminal of the second diode are connected to the mid-voltage conductor of the plurality of capacitors,
a cathode terminal of the second diode is connected to a source terminal of the second switch, and
a drain terminal of the second switch is connected to the high-voltage conductor of the plurality of capacitors.

20. The method of claim 11, wherein the at least two diodes or the at least two switches comprise the at least two diodes and the at least two switches, wherein the at least two diodes comprise a diode bridge comprising an anode terminal, a cathode terminal, a first alternating current terminal, and a second alternating current terminal, wherein the at least two switches comprise:
  a first switch; and
  a second switch,
wherein the at least two output conductors comprise:
  a low-voltage output conductor; and
  a high-voltage output conductor,
wherein the at least three input conductors comprise:
  a low-voltage conductor of the plurality of capacitors;
  a mid-voltage conductor of the plurality of capacitors; and
  a high-voltage conductor of the plurality of capacitors, and
wherein:
  a source terminal of the first switch is connected to the low-voltage conductor of the plurality of capacitors,
  the cathode terminal of the diode bridge is connected to the high-voltage output conductor,
  the anode terminal of the diode bridge is connected to the low-voltage output conductor,
  a drain terminal of the first switch is connected to the source terminal of the second switch and the first alternating current terminal of the diode bridge,
  the second alternating current terminal of the diode bridge is connected to the mid-voltage conductor of the plurality of capacitors, and
  a drain terminal of the second switch is connected to the high-voltage conductor of the plurality of capacitors.

\* \* \* \* \*